United States Patent [19]

Reid

[11] Patent Number: 5,041,217

[45] Date of Patent: * Aug. 20, 1991

[54] APPARATUS FOR MAXIMIZING BIOLOGICAL USE OF ENTIRE VOLUME OF ENDLESS CHANNEL IN AN OXIDATION DITCH

[76] Inventor: John H. Reid, 7 Stansbury Ct., Fredericksburg, Va. 22401

[*] Notice: The portion of the term of this patent subsequent to Aug. 27, 2002 has been disclaimed.

[21] Appl. No.: 576,153

[22] Filed: Aug. 29, 1990

Related U.S. Application Data

[60] Continuation of Ser. No. 790,304, Oct. 22, 1985, abandoned, which is a continuation of Ser. No. 429,166, Sep. 30, 1982, Pat. No. 4,548,712, which is a division of Ser. No. 282,592, Jul. 13, 1981, abandoned, which is a division of Ser. No. 28,383, Apr. 8, 1979, Pat. No. 4,278,547, which is a continuation-in-part of Ser. No. 848,705, Nov. 4, 1977, abandoned, which is a continuation-in-part of Ser. No. 649,995, Jan. 19, 1976, abandoned; this is additionally a continuation-in-part of Ser. No. 621,740, Jun. 18, 1984, abandoned, which is a continuation-in-part of Ser. No. 355,150, Mar. 5, 1982, Pat. No. 4,460,471, which is a continuation of Ser. No. 848,705, Nov. 4, 1977, abandoned.

[51] Int. Cl.$^5$ ................................................ C02F 3/20
[52] U.S. Cl. ..................................... 210/194; 210/219; 210/220; 210/926; 261/123; 261/DIG. 75
[58] Field of Search ............... 210/607, 678, 679, 747, 210/170, 194, 199, 219-221.2, 926, 320; 261/123, DIG. 75, 36.1

[56] References Cited

U.S. PATENT DOCUMENTS

| 2,826,306 | 3/1958 | Burns | 210/115 |
|---|---|---|---|
| 3,846,292 | 4/1971 | Lecompte, Jr. | 210/14 |
| 3,897,000 | 7/1975 | Mandt | 239/177 |
| 3,954,606 | 5/1976 | Block et al. | 261/91 |
| 3,990,974 | 11/1976 | Sullins | 210/96 |
| 4,199,452 | 4/1980 | Mandt | 210/104 |
| 4,365,938 | 12/1982 | Warinner | 417/54 |
| 4,440,645 | 4/1984 | Kite | 210/626 |
| 4,537,679 | 8/1985 | Reid | 210/194 |
| 4,614,589 | 9/1986 | Weis | 210/926 |
| 4,818,391 | 4/1989 | Love | 210/926 X |

FOREIGN PATENT DOCUMENTS

| 2300373 | 1/1972 | Fed. Rep. of Germany. | |
| 2329684 | 1/1975 | Fed. Rep. of Germany | 210/320 |
| 166160 | 8/1974 | Hungary. | |
| 59-112894 | 6/1984 | Japan | 210/926 |
| 729 | of 1915 | United Kingdom | 210/926 |

Primary Examiner—Thomas Wyse
Attorney, Agent, or Firm—Marion P. Lelong; William H. Murray

[57] ABSTRACT

A process and any of several pump/circulators provide selective rapid mixing of influent wastewater with the mixed liquor in the channel of an oxidation ditch and thereby provide maximized use of the entire volume of the channel. The pump/circulator is disposed at the beginning of the anoxic zone and preferably receives the influent wastewater. The oxidation ditch is preferably a barrier oxidation ditch or at least a baffle oxidation ditch in order to prevent backmixing.

4 Claims, 24 Drawing Sheets

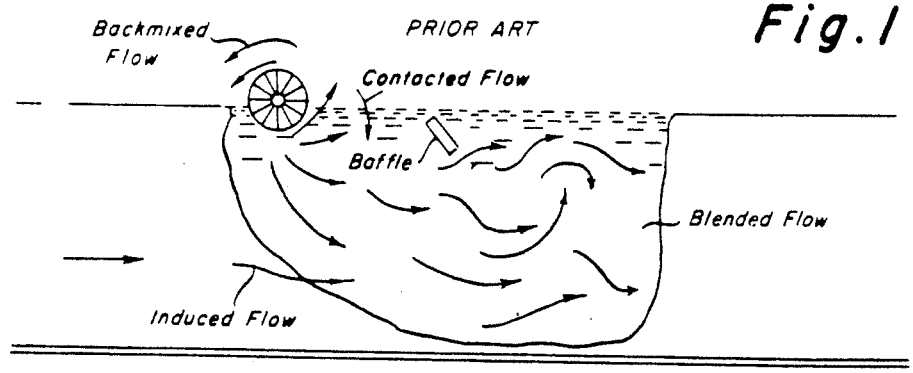
Fig. 1
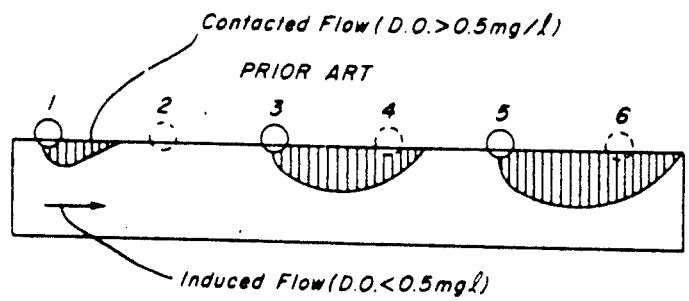
Fig. 2
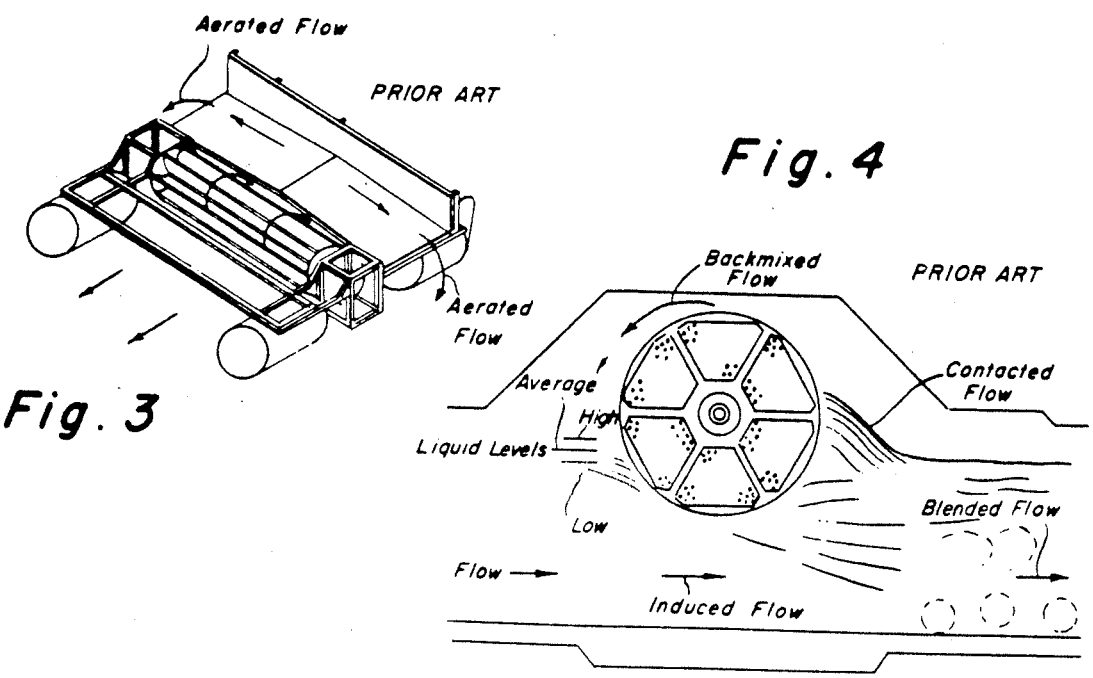
Fig. 3
Fig. 4

River (clear)
Tributary Creek (muddy)
Construction Areas

Mixing Distance of Prior Art
Wastewater

Mixing Distance of Prior Art

APPARATUS FOR MAXIMIZING BIOLOGICAL USE OF ENTIRE VOLUME OF ENDLESS CHANNEL IN AN OXIDATION DITCH

CROSS REFERENCE TO RELATED APPLICATIONS

This is a continuation of copending application Ser. No. 06/790,304 filed on Oct. 22, 1985, abandoned which is a continuation-in-part of application Ser. No. 429,166, filed Sept. 30, 1982, now U.S. Pat. No. 4,548,712; which is a division of application Ser. No. 282,592, filed Jul. 13, 1981 now abandoned; which is a division of application Ser. No. 28,383, filed Apr. 9, 1979, now U.S. Pat. No. 4,278,547; which is a continuation-in-part of application Ser. No. 848,705, filed Nov. 4, 1977 and now abandoned; which is a continuation-in-part of application Ser. No. 649,995, filed Jan. 19, 1976, and now abandoned; this is additionally a continuation-in-part of application Ser. No. 621,740, filed Jun. 18, 1984 now abandoned; which is a continuation-in-part of application Ser. No. 355,150, filed Mar. 5, 1982, now U.S. Pat. No. 4,460,471; which is a continuation of application Ser. No. 848,705, filed Nov. 4, 1977, and now abandoned.

BACKGROUND OF THE INVENTION

1. Field of the Invention

This invention relates to gas-liquid contacting devices and the use of such devices in liquid treatment. The invention especially relates to methods and apparatuses for aeration pumping in activated sludge processes, particularly when conducted in oxidation ditches of racetrack or loop channel configuration.

2. Review of the Prior Art

Many liquid waste treatment processes, commonly termed aerobic processes, supply bacteria and other microorganisms with dissolved oxygen for treating aqueous wastes such as municipal sewage, tannery wastes, dairy wastes, meat-processing wastes, and the like.

One such aerobic process is the activated sludge process, in which the microorganisms are concentrated as an activated sludge to be mixed with incoming wastewater, which supplies food for the organisms. The apparatuses in which the activated sludge process is conducted comprise an aeration basin (reactor basin) and a final clarifier (settling tank). The aeration basin serves as a culturing basin in which to generate the growth of bacteria, protozoa, and other types of microorganisms, so that they can consume the pollutants in the raw waste entering the basin by converting the pollutants into energy, carbon dioxide, water, and cells (biomass).

The activated sludge process is effective for controlling this conversion activity within the aeration basin, for settling the biomass within the clarifier, for overflowing the purified liquor or effluent from the clarifier to discharge, and for returning the settled biomass from the clarifier to the aeration basin. Thus the activated sludge process is a suspended-growth, aerobic, biological treatment process, using an aeration basin and a settling tank, which is capable of producing very pure, high quality effluent, as long as the biomass settles properly.

It can thus be compared to a fixed-growth process wherein the growth of the biomass occurs on or within a tower on plastic media or in a trickling filter on rocks packed therewithin.

The activated sludge process is represented by two prime mixing regimes, plug flow and complete mixing, which represent the opposite extremes of a continuum and almost infinite variety of intermediate mixing modes.

Plug-flow is characterized by use of relatively long, narrow aeration tanks or basins into which wastewater, with or without return sludge, is added at one end and from which it flows at the opposite end to enter a clarifier. The inflowing wastewater progressively moves down the tank length, essentially unmixed with the balance of the tank contents. Dissolved oxygen is generally added along the entire length of the basin. Intermediate mixing modes are sometimes termed semi-plug flow systems and include introduction of return sludge and/or wastewater at a plurality of positions along the length of the basin. A disadvantage is that plug-flow systems are inherently dominated by the inflowing wastewater which volumetrically overpowers the returning activated sludge so that temporary or cyclic variations in wastewater characteristics, such as unusually large quantities of materials poisonous to microorganisms, can cause shock loadings that can at least temporarily inactivate the system.

Plug-flow systems are characterized by a dissolved-oxygen gradient. The dissolved-oxygen content is low at the entrance to the elongated basin, where raw waste and activated sludge are generally combined, and increases to a high level at the discharge end of the basin where the pollutants have been substantially consumed. However, plug-flow systems are not operated to include an anoxic zone within the basin.

In addition to its oxygen gradient, a plug-flow system is also characterized by a gradient in oxygen uptake rate of its mixed liquor. The rate is necessarily highest at the inlet end of the plug-flow aeration basin, lowest at the outlet end, and progressively decreasing along its length because the food supply steadily decreases from the inlet end to the outlet end.

Complete-mix systems are designed so that if samples are taken simultaneously over the basin area, the measured properties are essentially uniform as a theoretical aim. As one of these properties, the dissolved-oxygen content (D.O.) is maintained as uniformly as possible at an average dissolved-oxygen content of 2.0 mg of $O_2$/l. In practice, the D.O. concentration is usually not uniform because higher D.O. concentrations are found closer to the aerators and to the liquid surface (particularly if surface aerators are used) and because lower D.O. concentrations are found near the sides and the bottom of the basin.

Complete mixing is commonly conducted in round or square tanks into which incoming wastes are fed at numerous places. The contents of the tanks are sufficiently mixed to insure that the incoming wastes are rapidly dispersed throughout the tank, in contrast to plug-flow systems. The volume of mixed liquor in the tank is so much greater than the volume of the wastewater that the wastewater is overwhelmingly dominated by the tank contents. Thus there is a relatively uniform food/microorganism ratio existing in such complete-mix tanks. Also, there is a uniform concentration of mixed liquor-suspended solids (MLSS) to be found in complete-mix aeration tanks as contrasted with the variable concentration noted in the plug-flow and semi-plug flow tanks.

An endless fill-and draw system, using multiple baffles and air diffusers for propulsion and BOD removal in an activated sludge process, is described in U.S. Pat. No. 1,247,542.

As a variation of the activated sludge process, A. Pasveer of the Netherlands received Dutch Patent No. 87,500 in 1951 for an aeration basin provided with a horizontally mounted rotor having brush surfaces for adding oxygen to sewage and impelling the surface of the sewage to flow in a closed-loop circuit within an ovally laid-out ditch having a racetrack shape in plan view. The ditch was intermittently operated; mixed liquor was circulated and aerated for a period of time, the liquor was then clarified by settling, excess sludge was removed, and wastewater addition and operation of the rotor were resumed. This invention, known as an oxidation ditch, is also disclosed in British Patent No. 796,438.

In subsequent developments, the intermittently operated oxidation ditch became a continuous system by combining the ditch with a final clarifier so that the oxidation ditch itself became an activated-sludge aeration basin. In addition, the brush rotors were replaced with cage rotors having paddles or blades for chopping into the surface of the water and hurling a portion downstream to create surface aeration and induce the flow of the mixed liquor therebeneath.

A rotor equipped with blades mounted in a ditch having a depth greater than seven feet is illustrated in FIG. 1. Because of this depth, an inclined baffle is positioned about 4 to 15 feet downstream of the rotor in order to provide mixing of aerated liquor near the surface with unaerated liquor which is flowing near the bottom. The stratification that results from operating a ditch without baffles is shown in FIG. 2 as a cross section of a ditch equipped with six horizontal-shaft rotors for treating municipal sewage, rotors 2, 4, and 6 being idle. The hatched zones have a D.O. content of 0.5–1.5 mg $O_2$/l, and the unmarked liquor therebeneath has a D.O. content of less than 0.5 mg $O_2$/l, according to an article, published in 1976, entitled "Activated Sludge Process II—Nitrogen Removal, Phosphorus Removal, Aeration-Transfer of Pure Oxygen", by Wilhelm von der Emde, Institut fur Wasserversorgung, Abwasserreinigung and Gewasserschutz, TC Wein, A-1040 Wein, Austria.

In order to provide a system capable of treating high peak flow of wastewater and even excessive storm water flows, an oxidation ditch has been developed which has a channel of varied cross section and is aerated by a horizontal-shaft surface aerator supported on floats. This aerator is depicted in FIG. 3 and is described in U.S. Pat. No. 3,759,495. It is equipped with curved blades and a baffle which prevents the recirculation of freshly aerated fluid immediately back through the device a second time, the aerated fluid being lifted and revolved toward the baffle and then routed around either side of the device.

In another development, cage rotors have been replaced with surface aerators in the form of rotors having horizontally disposed shafts and large-diameter plastic discs mounted transversely thereupon. About forty percent of the surface area of these discs is immersed in the liquor. They have many holes therethrough and operate by rotationally dipping into the surface of the liquor to pump the liquor by hydraulic friction, to bring air therebeneath, and to lift liquor thereabove so that the covering layer of aerobic bio-mass absorbs oxygen and removes organic materials from the wastewater.

FIG. 4 is an end view of a horizontal shaft disc aerator operating in an aeration channel.

A further improvement in oxidation ditch systems was described by 1970 in U.S. Pat. No. 3,510,110, comprising the location of a slow-speed mechanical surface aerator, having a vertically disposed shaft, at one end of a longitudinal partition that forms the straight channels of an oxidation ditch, the aerator being disposed close enough to the end of the partition and being so aligned therewith that the partition closes off the circuit on one side of the surface aerator. By providing a highly aerated surface condition and by impacting the circularly toroidal flow upon the longitudinal partition, the flow is converted into a slow spiraling flow downstream of the aerator.

FIG. 5 is a plan view and FIG. 6 is a sectional side view of such an oxidation ditch in which a surface aerator, mounted vertically and close to the dividing wall, creates a complete-mix aeration zone throughout the end of the ditch surrounding the aerator, transfers dissolved oxygen to the mixed liquor, and imparts sufficient velocity to suspend 4,000 mg/l of solids.

Another development that has been principally used in very deep oxidation ditches is the directional mix jet aerator system (eddy jet) which utilizes a plurality of subsurface ejector aerators which are connected to a transversely disposed header at the bottom of the channel as described in U.S. Pat. No. 3,846,292. This system is shown in FIG. 7 as a circular open-channel oxidation ditch having four headers which are connected to a blower and a submersible pump. The mixing pattern is shown as a section through a header and the surrounding mixed liquor in FIG. 8.

U.S. Pat. No. 3,900,394 describes a circuit-flow oxidation ditch having a vertically mounted, impeller-type mechanical surface aerator at one or both ends which emphasizes the use of an oxidation ditch for denitrification in an activated sludge extended aeration process. At a loading of 6000–8000 mg/l of mixed liquor suspended solids and at a depth up to 14 feet, this system is described as capable of maintaining suspension of the solids throughout a channel length of up to 900 feet.

It is pertinent to note that a conventional circuit-flow oxidation ditch of the prior art operates as a complete-mix system except that its D.O. gradient is characteristically plug-flow. Circulation of the entire basin contents during each cycle, while admixing the mixed liquor with the relatively minor stream of inflowing wastewater, ensures such complete-mix conditions.

Although it could be stretched out so that its racetrack or looped channel would be a mile in length, for example, so that the circuit flow in its channel would be comparable to that of the inflowing wastewater in volume, such as 1:1 to 3:1 (the latter being a dilution ratio for settled sewage in U.S. Pat. No. 1,643,273 of Imhoff, for example), thereby simulating a true plug-flow activated-sludge system, it would then be subject to shock-load effects, the food-to-microorganism ratio being so high that the microorganisms could readily be overwhelmed by incoming poisons or other changes in the food situation. Preferably, therefore, an oxidation ditch is sufficiently short that its channel flow of mixed liquor is ample to dilute the inflowing wastewater by volume ratios of 100:1 to 200:1 or greater, whereby the inflowing wastewater is completely dominated volumetrically by the mixed liquor in the ditch and the food-to-microorganism ratio is low enough that the microorganisms can handle any reasonable change in food properties, thereby simulating a true complete-mix system.

At such desirable volume ratios, an oxidation ditch can be designed to operate with recycled sludge within its channel on a food-to-microorganism ratio (F/M) by weight that varies over a possible range of 0.01 to 5.0, depending upon space, cost, and process design requirements, by varying the concentration of microorganisms, expressed as mixed liquor suspended solids (MLSS), flowing within its channel. If operating at a low F/M ratio of 0.01-0.2, it is an extended aeration system, producing small quantities of sludge. If operating at a medium F/M ratio of 0.2-0.5, it is a conventional system. If operating at a high F/M ratio of 0.5-2.5, it is a high-rate activated sludge system, producing large quantities of sludge. Moreover, it can even be operated as an aerated lagoon with no recycle sludge at F/M ratios above 2.5, but it is then not operating according to the activated sludge process and is therefore not herein defined as an oxidation ditch.

An oxidation ditch may also shift through a wide F/M range, representing all three of these systems, as it begins operation as a high-rate activated sludge system, with no built-up sludge, and gradually builds up its recycled sludge to a mixed liquor suspended solids (MLSS) content of 3,000 mg/l where extended aeration can generally be considered to begin. In general, an oxidation ditch is considered for design purposes to exist when the MLSS content reaches about 1500 mg/l, because at lower levels the size of the ditch would have to be excessive, but the principles of its operation are nevertheless applicable at much lower MLSS levels, such as at 1,000 mg/l.

It is significant that increasing the concentration of the microorganisms increases the total amount of oxygen used in an oxidation ditch of given volume and necessitates a higher flow velocity to maintain the greater mass of solids in suspension. At a given rate of food inflow (F), increasing the concentration (M) of microorganisms obviously decreases the F/M ratio. A change in the F/M ratio also affects the $O_2$ transfer rate (measured as pounds of oxygen per hour at process conditions) for which the ditch must be designed, as is known in the art. For example, using F/M to represent pounds of five-day biochemical oxygen demand, BOD(5) per pound of microorganisms, A/F to represent pounds of oxygen per pound of BOD(5), and A/M to represent pounds of oxygen per pound of microorganisms, the following approximate relationships are known in the art:

| Type of activated sludge process | Sludge age, days | Excess biological solids (cells) produced per lb. BOD (5) applied | Typical MLSS content, mg/l | F/M | A/F | A/M |
|---|---|---|---|---|---|---|
| High rate load | 0.5–2 | >1 | 500–1000 | 1.0 | 0.7 | 0.7 |
| Conventional load | >2 <6 | 1 > 0.35 | >1000 <3000 | 0.3 | 1.0 | 0.3 |
| Extended aeration | >6 <20 | <0.35 >0.2 | >3000 <5000 | 0.1 | 1.2 | 0.1 |
| Low load extended aeration (typical for oxidation ditch) | >12 | <0.2 | >3000 | 0.05 | 1.5 | 0.08 |

-continued

| Type of activated sludge process | Sludge age, days | Excess biological solids (cells) produced per lb. BOD (5) applied | Typical MLSS content, mg/l | F/M | A/F | A/M |
|---|---|---|---|---|---|---|

In order to remove nitrogen from a wastewater, in which it may be measured as total nitrogen or total Kjeldahl nitrogen, all systems using the wastewater as the chief organic carbon source for denitrification employ an alternating aerobic-anoxic sequence of stages, without intermediate clarification, to effect total nitrogen removal while attempting to avoid ammonia nitrogen bleedthrough. An oxidation ditch can be used for this purpose by controlling the level of aeration so that the mixed liquor is recirculated many times through alternating aerobic and anoxic zones prior to discharge from the channel of the ditch. To operate effectively, however, it is important that both zones be uninterrupted; i.e., aeration should occur at a single location immediately preceding the aerobic zone and should not recur until at least the end of the anoxic zone. If aeration occurs at only one location, so that there follows downstream thereafter one and only one aerobic zone, one and only one anoxic zone, and, if desired, an oxygen-deficient zone within the channel of the ditch, it is herein defined as point-source aeration. If there are multiple zones of each type, there is "multi-source aeration".

"Point-source aeration", "point-source mixing", and "point-source propulsion" are terms signifying that these three properties (hereinafter generally termed "point-source treatment") each originate at a single location within the channel of an oxidation ditch, in contrast to multiple locations therefor.

It is desirable that all of the mixed liquor of an oxidation ditch be homogeneously mixed with the inflowing waste, with the return sludge, and with an oxygen-containing gas which is hereinafter considered to be air. All three of these mixing operations can be simultaneously conducted, any two can be simultaneously conducted, or each can be separately conducted as either point source or multi-source operations.

When the mixed liquor is mixed with air, oxygen is dissolved in (i.e., transferred to) the mixed liquor. With respect to energy consumption, it is important whether such transfer is merely to a portion of the mixed liquor or to all of it. If the former, this portion must be aerated relatively intensively in order that after blending there will be the desired $O_2$ content; it is herein termed heterogeneous aeration. If the latter, it is termed homogenous aeration which is herein specifically defined as the homogenous transfer of all required process oxygen into all of the mixed liquor of an oxidation ditch by direct-contact aeration. Either homogenous or heterogenous aeration can be point source or multi-source.

In all oxidation ditches of the prior art, the functions of aeration and propulsion of the mixed liquor are combined in a single device which is installed so that it contacts and mixes merely a portion of the mixed liquor with air. This device may be a horizontally shafted surface aerator, a vertically shafted surface aerator, or a single header of a directional mix jet aerator. A vertically shafted surface aerator may be high speed or low speed, and both horizontally and vertically shafted surface aerators may be fixed or floating. Such a device is hereinafter generally designated a pump/aerator.

Point-source propulsion signifies that all propulsive energy necessary for generating adequate velocity for all of the mixed liquor in the entire ditch is disposed at one location. The amount of this propulsive energy is roughly comparable to hydraulic head and can be measured as the length of channel between aerators. In the prior art, it is believed that directional mix jet aerators are capable of subsurface propulsion of the mixed liquor for 200–300 feet, that horizontally mounted surface aerators are capable of propelling the mixed liquor for 200–500 feet between pump/aerators, and that vertically mounted surface aerators can propel the mixed liquor at adequate velocities for up to 900 feet between pump/aerators when the concentration of mixed liquor suspended solids exceeds 3,000 mg/l or ppm.

It is a self-evident fact in the prior art that the pump/aerators are additionally limited not only as to the length of channel between pump/aerators but also as to volumetric capacity or volume of flow within the channel, commonly defined as circulation rate in cubic feet per second or cubic meters per hour. The result is that in a large oxidation ditch (which is typically of looped channel configuration) the pump/aerators must be installed at intervals along the channel to operate in series, creating multiple aerobic and anoxic zones. Because of the multiplicity of the zones, it is relatively difficult to control the respective volumes of the aerobic and anoxic zones.

Using the oxidation ditch 20 shown in FIG. 9 as a theoretical example of point source aeration and point-source propulsion, pump/aerator 21 divides its channel into intake channel 22 and discharge channel 23. Mixed liquor flows translationally in direction 30. Mixed liquor 24 is withdrawn to a clarifier which separates it into clarified liquor and settled sludge 25. Wastewater inflow 26 may be disposed within intake channel 22 but is preferably located upstream thereof within anoxic zone 28 which stretches from end 31 of aerobic zone 27 to its end 36. Aerobic zone 27 is considered to begin at pump/aerator 21.

Aerobic zone 27 can be operationally defined as beginning with the initial transfer of dissolved oxygen into the mixed liquor and as ending with the dissolved oxygen content (D.O.) dwindling to 0.5 mg/l at end 31. The length of aerobic zone 27 is determined by the input food supply, the concentration, mass, and type of microorganisms that are available, the D.O. content at the beginning of the zone, the K-rate or B.O.D. removal rate of the biomass, the $O_2$ uptake rate of the biomass, the type of food (soluble and insoluble), the velocity of flow 30, and the temperature of the mixed liquor.

Anoxic zone 28 is characterized by having 0.0 to 0.5 mg/l of dissolved oxygen but is herein defined as the oxygen-depleted zone of activity for the heterotrophic facultative (denitrifying) bacteria and autotrophic (denitrifying) bacteria which obtain their needed oxygen from nitrate anions (liberating nitrogen as $N_2$) and their food from organic carbon or $H_2S$. The organic carbon is available in: (1) the inflowing wastewater, (2) the cell biomass in the mixed liquor, or (3) the organic carbon adsorbed by the biomass of the mixed liquor. Theoretically 62.5 percent of the oxygen required for nitrification can be used for B.O.D. removal by denitrifiers, thus reducing power consumption for oxygenation.

As oxidation ditches are commonly designed for denitrifying at the present time, end 36 is apt to coincide with pump/aerator 21, and anoxic zone 28 can be volumetrically defined as the difference between the total channel volume and the volume of the aerobic zone. In such a commonly occurring situation, a downstream movement of end 31 to position 33 causes anoxic zone 27 to become shorter and smaller so that denitrification may become less complete, depending upon mixed liquor temperature and nitrate concentration in the mixed liquor at the beginning of the anoxic zone.

If, however, the ditch is large enough that anoxic end 36 is spaced from pump/aerator 21, movement of aerobic end 31 to position 33 causes anoxic end 36 to move upstream to position 37, and movement to position 33 also causes a downstream movement to position 38 without diminishing the volume of anoxic zone 28.

The volume between end 36 and pump/aerator 21 is herein defined as oxygen-deficient zone 29 which is characterized as having a D.O. of 0.0 mg/l (no measurable D.O. and no oxygen present in the form of nitrates) through which aerobic and facultative microorganisms circulate. Such an oxygen deficiency causes an oxygen-starved condition in the mixed liquor which is believed to create a "luxury" uptake rate of oxygen when initial contact of the microorganisms occurs with dissolved oxygen or even with undissolved air bubbles or undissolved oxygen. It is believed that this luxury rate occurs because the microorganisms adsorb oxygen with great avidity, immediately absorb the adsorbed oxygen to replenish their systems, and then promptly adsorb a further supply of oxygen in a normal manner.

The practical meaning of point-source treatment is that the volume of aerobic zone 27 can be controlled simply by varying the air or oxygen supplied to the mixed liquor by the point-source aeration device, thereby causing anoxic zone 28 merely to shift position if the oxidation ditch is long enough. Because the wastewater load to an oxidation is typically subject to change on a daily, weekend, weekly, and/or seasonal basis, it is important to be able to control the respective lengths 34, 35, 39, of aerobic zone 27, anoxic zone 28, and oxygen deficient zone 29 in order to maximize BOD(5) removal and $N_2$ removal by the nitrifiers and denitrifers and thereby minimize the amount of oxygen that must be transferred by the point-source aeration device. Point-source aeration and separately operated point-source propulsion greatly simplify such control.

When influent wastewater is added at any point along the length of the channel of any oxidation ditch, a portion of the channel downstream of such inflow is required for mixing with the mixed liquor. The situation may be compared to the commonly observed demarcation between the waters of a clear river and a tributary muddy creek, as depicted in FIG. 4. The similar mixing delay that occurs in an oxidation ditch is illustrated in FIG. 5 in plan view and in FIG. 6 as an elevational sectional view of the channel. It can readily be observed that portions 43 of anoxic zone 28, between and above streams of incoming wastewater, are wasted with respect to use of the food source in the inflowing wastewater stream. The microorganisms within such portions 43 therefore remain unstimulated through a significant fraction of anoxic zone 28. In consequence, the volume of anoxic zone 28 is under-utilized so that end 36 must fall farther downstream, thereby shortening the length of oxygen-deficient zone 29.

There is clearly a need for a method and a means for substantially instantaneous mixing of the wastewater inflow with the translationally flowing mixed liquor in order to have all of the anoxic zone available for full activity of its microorganisms.

U.S. Pat. No. 3,900,394 teaches the use of a circulator/aerator 44, as shown in FIG. 7, which may be either horizontally or vertically disposed but which has no means for independently controlling the propulsion and aeration of the mixed liquor. It also teaches the use of a circulator/mixer, shown as mixing and propulsion means 48 in FIG. 7. This patent states that "additional raw sewage liquid was introduced for the denitrification reaction" at the "point of substantial oxygen consumption", yet mixing and propulsion means 48 is not located at that point which should be the end of its anoxic zone, equivalent to end 36 in FIG. 1, yet agitator 48 also significant that each influent conduit 58 is located in the complete mix zone of one of the aerators 52, 54, 56. None is located at the beginning of an anoxic zone. Further, there is no teaching that point "D" should be maintained at a chosen location; quite the contrary, point is not located at that point but is instead located upstream thereof, at one-half of the flow distance between successive encounters with agitator 44. Such a location appears to be inherently required by the necessary interaction between the discharges of apparatuses 44, 48 and flow dividers of the oxidation ditch.

U.S. Pat. No. 4,159,243 describes a process in which the dissolved oxygen concentration is measured by two or more oxygen probes 51, 53, 55 which are immersed in the liquor within the channel of an orbital system having aerators 52, 54, 56, as seen in FIG. 8, and thereby control the amount of oxygen dissolved in the mixed liquor and the location of point "D" so that sufficient denitrification will occur, regardless of the strength or rate of sewage introduction into the channel. As shown in FIG. 8, zones "A" and "B" are totally aerobic. Effluent 59 must have no more than the limit of $NO_3$ content. The distance downstream from point "D", where the mixed liquor becomes anoxic, to the beginning of zone "A", is available in zone "C" as insurance to ensure that denitrification does take place. Each mixing operation is believed to have a diffused end 57 which could be dissipated by passage through a bend in the channel. It is "D" is deliberately moved up and down the channel in various embodiments, independently of the location of any influent conduit 58.

Hungarian Patent No. 166,160 discloses an aerating apparatus which sucks in air through its hollow shaft and discharges it through openings in its hollow impeller blades, whereupon air bubbles mix with liquid through its suction orifice. In consequence, the speed of rotation of the impeller blades controls the amount of incoming air; air input and liquid velocity, therefore, cannot be independently controlled. The practical result is that the end of the anoxic zone cannot be maintained at a selected location, such as the location of a circulator/mixer for influent wastewater and, if desired, return sludge.

In general, when an attempt is made to operate an oxidation ditch of the prior art with a single pump/aerator to aerate, mix, and propel the mixed liquor translationally through the channel of the ditch, the following problems, stated briefly, are typically encountered:

(1) a single/pump/aerator cannot generate sufficient hydraulic head to pump the mixed liquor at an adequate circulation rate to produce and maintain a flow velocity that is high enough around the entire ditch to keep mixed liquor solids in suspension when MLSS concentration exceeds 3,000 mg/l and ditch length exceeds: (a) 900 feet and a vertically mounted surface aerator furnishes surface aeration, (b) 300-500 feet and a horizontally mounted rotor furnishes surface aeration and (c) 200 feet and diffusers or directional mix jet aerators furnish subsurface aeration.

(2) two or more pump/aerators cannot be concentrated (to operate as pump/aerators in parallel) in sufficiently close proximity for generating this necessary head at an adequate circulation rate and for transferring adequate oxygen at one point in an oxidation ditch to a mixed liquor containing more than 3,000 mg/l MLSS when the length of the endless channel exceeds 200-900 feet for specific aerators as previously set forth in (a)-(c) of (1);

(3) the dissolved-oxygen content of the mixed liquor cannot be changed without simultaneously changing its flow velocity since the channel circulation flow rate and velocity and $O_2$ transfer rate are dependently related because they are imparted by the same device;

(4) an excessive energy price must be paid for heterogeneous aeration which is herein defined as intensively contacting, pumping, and aerating a portion of the mixed liquor and then blending the contacted-flow portion with the induced-flow portion, which is flowing past the aerator without receiving oxygen, to produce the desired average D.O. content in the mixed liquor:

(5) energy is wasted when prior art devices attempt to re-aerate freshly aerated mixed liquor that has been back-mixed into the intake of the aerator;

(6) When pumping and transferring oxygen to the mixed liquor by prior art aeration devices, it is not possible to compensate for depth variations beyond ± one foot (except jet aerators as shown in FIGS. 7 and 8 and diffusers combined with baffles) without using floating devices for the aerators; and (7) aeration devices of the prior art are highly susceptible to icing and other cold weather problems (except jet aerators as shown in FIGS. 7 and 8 and diffusers combined with baffles), because surface aeration is employed.

These problems associated with prior art oxidation ditches are discussed in detail as follows with reference to FIGS. 10-16 of the drawings:

(1) Inadequate hydraulic head for entire ditch

This problem is created by the prior art attempting to conserve the momentum of the circulating mixed liquor by mounting the pump/aerator so that it interferes with the flow of this mixed liquor as little as possible and pumps a relatively small portion of the total flow. For example, the blades of one type of rotor dip into the surface of the mixed liquor to a depth of 4-12 inches, while the underlying liquor flows past undisturbed throughout a depth of 4-14 feet, minus the depth of blade penetration. After blending, as by means of an inclined baffle as seen in FIG. 1, its motion may be said to be "induced" by the energy in the contacted-flow portion. If hydraulic friction with the bottom and sides of the channel is sufficiently great downstream of the rotor, there is no available means to generate the necessary hydraulic head that will force the blended portions (i.e., the total flow) to move at a velocity sufficient to sustain its load of suspended solids until it returns to the rotor unless the oxidation ditch is a short one (e.g., 200-900 feet, depending on the type of aerator as previously set forth, when the MLSS concentration exceeds 3,000 mg/l, in (a)-(c) of (1).

(2) Inability to group pump/aerators in close proximity

If point-source treatment is to be maintained in a large oxidation ditch, it is necessary to increase horsepower input or to widen the channel and place two or more pump/aerator devices side by side or in otherwise close proximity in order to obtain adequate circulation rate. However, the devices of the prior art cannot be built to operate at more than 100 to 150 horsepower, depending upon the type of aerator, and are not adapted to operate in close proximity for pumping in parallel. Thus the only alternative is to lengthen the ditch, in order to obtain adequate ditch volume and the desired F/M ratio, and then to install a plurality of spaced-apart single pump/aerators furnishing multi-source aeration and multi-source propulsion.

(3) Simultaneous change of dissolved-oxygen content and flow velocity

The first three problems are closely interrelated and are discussed together in detail herein because any change in: (a) depth of submergence or speed of rotation for surface aerators or impellers or (b) liquid pumping rate or pressure of compressed air for jet aerators will simultaneously cause changes in both the D.O. content and the flow velocity of the mixed liquor. Such changes will be in proportion to the energy input to the pump/aerators. Nevertheless, variations in mixed liquor temperature or of inflowing wastewater characteristics, such as BOD(5) content or nitrogen content, may require, for example, an increase in D.O. content and a decrease in flow velocity.

In consequence, in a prior art oxidation ditch employing multi-source aeration from a plurality of spaced-apart pump/aerators, the lengths of the aerobic and anoxic zones may tend to vary according to inflowing wastewater and temperature conditions, but the fixed locations of the pump/aerators may inhibit flexible operation in accordance therewith. For example, as indicated in FIG. 10, conveniently spaced-apart rotor aerators 41 are often located, at least temporarily, within an anoxic zone 43 or are otherwise improperly spaced apart between aerobic zones 42 and anoxic zones 43 for proper nitrification/denitrification of the wastewater when utilizing organic carbon in the wastewater as the hydrogen acceptor.

Thus, rotor-equipped oxidation ditches have been operated for nitrification/denitrification by shutting down one or more rotors in order to obtain sufficiently long anoxic zones while hopefully retaining sufficient translational velocity to maintain the biomass in suspension. This procedure has been used, for example, at the Vienna-Blumenthal plant in Vienna, Austria, as discussed in "Process Design Manual for Nitrogen Control", October 1975, pages 5–42 through 5–45, which is available from the Office of Technology Transfer, U.S. Environmental Protection Agency, Cincinnati, Ohio 45268.

As stated on pages 5–48 of the EPA "Process Design Manual for Nitrogen Control": "It has been found that the cage aerators which are typically employed in the oxidation ditch are not well suited to nitrogen removal applications. The cage aerator is not capable of simultaneously mixing and maintaining DO control; too much oxygen is imparted to allow development of alternating aerobic and anoxic zones while maintaining sufficient ditch velocities (one fps or 0.30 m/s) for prevention of settling of solids in the ditch. In one case, the problem was solved by providing separate submerged propellers for mixing which allowed the cage rotor to be managed for DO control alone."

In a large oxidation ditch employing the Carrousel system (slow speed, vertically shafted surface aerators), requiring over 100–150 horsepower for supplying the process $O_2$ requirement, multi-source aeration is obtained by arranging the ditch to include several looped channels which are connected by channel turning points or bends. A vertical-shaft surface aerator 44 is installed in two or more of these bends, as indicated in FIG. 11. Nitrification and denitrification are controlled by turning off or cycling on and off one or more aerators, by varying the speed of selected aerators, or by varying the submergence of the aerators in order to control the translational flow and the lengths of the aerobic and anoxic zones 45, 46.

The directional-mix jet aerator system also appears to be propulsion limited because banks of headers 47 are typically spaced around an oxidation ditch at short intervals, as indicated in FIG. 12. The relatively high proportion of induced flow produces relatively short aerobic zones 48 and anoxic zones 49 as the mixed liquor moves counterclockwise through the channel. This system requires excessively high blower pressure to eject air at the bottom of a deep channel and also requires the operation and maintenance of a plurality of pumps to inject mixed liquor through the submerged jets for entraining the compressed air.

In the comparatively sized oxidation ditches of FIGS. 10–12, the spaced-apart aerators act as series pumps, but the velocity of mixed liquor flow does not change much in proportion to the number of units in operation. Referring to FIG. 10, the four 75-hp rotor aerators are each sized to supply about one-third of the total oxygen demand. Referring to FIG. 11, the three 100-hp low-speed surface aerators are each sized to supply about one-half of the total oxygen demand. Referring to FIG. 12, the six headers (each of which is designed to supply one fourth of the total oxygen demand) are individually connected to a 14-hp pump and are all connected to a 100-hp central compressor and one 100-hp standby compressor.

(4) Excessive energy consumption for heterogenous aeration

This problem is related to the propulsive limitation, the circulation rate limitation, and the aeration capacity limitation. The first three problems are also closely interrelated because the contacted-flow portion (actively pumped directly by the aeration device) not only receives all of the propulsive energy from the pump/aerator but also receives all of the dissolved oxygen by being contacted by or mixed with air, whereas the induced-flow portion directly receives neither propulsion energy nor oxygen. Therefore the final or maximum dissolved oxygen (D.O.) content of the contacted-flow portion must be great enough that the post-blended D.O. content of the total flow will be at the desired level, as indicated schematically in FIG. 13. The percentage of the total flow that is represented by the intensively aerated contacted-flow portion determines the maximum D.O. content to which this contacted-flow portion must be aerated in order to obtain a desired D.O. content in the blended flow.

The practical consequence of heterogeneous aeration is that, in general, when a pumped portion is intensively aerated and then blended with an induced-flow portion which is not aerated to produce a desired average dissolved-oxygen content, an energy price must be paid. The reason therefor is that when oxygenating water with air, the necessary driving force increases non-linearly as the dissolved-oxygen content of the water increases, as may be appreciated by considering the two-film theory of gas transfer.

This theory is based on a physical model in which two films exist at the gas-liquid interface. The two films, one liquid and one gas, provide the resistance to the passage of gas molecules between the bulk-liquid and the bulk-gaseous phases. For transfer of gas molecules from the gas phase to the liquid phase, slightly soluble gases encounter the primary resistance to transfer from the liquid film. FIG. 14 schematically illustrates the two-film gas transfer theory.

The rate of gas transfer, in general, is proportional to the difference between the existing gas concentration and the saturation concentration of the gas in solution. In equation form, this relationship can be expressed as:

$$\frac{dC}{dt} = K(C_s - C)$$

where
C = existing gas concentration
t = time
$C_s$ = saturation concentration of gas
K = proportionality constant K includes the effect of the resistance of either or both films and is also a function of the area of liquid-gas interface that exists per unit volume of fluid.

Oxygen is a slightly soluble gas in water so that traversing the liquid film from $C_1$ to C in FIG. 14 is the main obstacle for the oxygen molecules. This situation may be thought of as a resistance to crowding by the oxygen molecules in the water; the more closely packed they become, the more strongly they resist the influx of additional molecules so that the change of concentration with time, $$\frac{dC}{dt},$$

decreases at a decreasing rate when a constant-volume system is subjected to a constant power input while mixing air with liquid.

Practical consequences of this phenomenon are illustrated in FIG. 15 which is a typical curve for oxygen uptake by water, using an upflow submerged turbine at constant power, without a draft tube, and with a compressed-air sparge beneath the deeply submerged turbine impeller (but with no upper impeller), within a large tank filled with deaerated tap water, dissolved oxygen concentrations being determined by the Winkler method and being corrected for cobalt ion content.

The decreasing slope of dissolved-oxygen concentration as a function of mixing and aerating time (at constant external power input) indicates that the water is increasingly resisting the attempted transfer of oxygen from the air bubbles. Thus if an intensively aerated portion, representing 33 percent of the channel flow by weight, contains 6.0 mg/l of D.O. and is blended with an induced-flow portion representing 67 percent of the channel flow by weight and containing 0.0 mg/l of D.O., the final blended dissolved-oxygen content is 2.0 mg/l at an average power input (measured in minutes) of 1.15 (corresponding to an average D.O. content of C=3.0 mg/l as the contacted-flow portion is aerated from 0.0 to a maximum of 6.0 mg/l) as compared to 0.4 (in minutes), if the entire blended contents of the channel were homogenously aerated to a final homogenous D.O. content of 2.0 mg/l (corresponding to an average D.O. content of C=1.0 mg/l as 100 percent of the channel flow is directly aerated from 0.0 to a maximum of 2.0 mg/l).

The manufacturer of the floating surface aerator shown in FIG. 3 has published a graph showing the cost (at an unknown date) for introducing 1,000 pounds of oxygen into water having various percentages of oxygen. The graph was developed to illustrate the benefits of adjusting horsepower input to the diurnal flow of municipal sewage as compared to the cost of using a steady horsepower input all during the day and the night. This graph is reproduced as FIG. 16.

Now consulting FIG. 16 for costs of oxygen transfer at average D.O. contents of 3.0 mg/l and 1.0 mg/l, $4.40 and $3.30 per 1,000 pounds of transferred oxygen are respectively obtained. The difference of $1.10 represents a 33 percent increase in power cost requirement for operation of a prior art oxidation ditch because of this practice of intensive aeration of a contacted-flow portion only and subsequent blending with an induced-flow portion. The smaller the portion of the total flow that is intensively aerated and the higher the final blended D.O. content that is desired downstream of a pump/aerator of the prior art, the higher the energy price that must be paid for such heterogenous aeration.

(5) Back-mixing

When blade and cage rotors as seen in FIGS. 1 and 3 and disc rotors as seen in FIG. 4 are operated, they recirculate on their surfaces or in their holes or throw backwards towards their intakes much freshly aerated liquor from which the microorganisms have not had time to absorb the dissolved oxygen. Thus this recirculated liquor has an $O_2$ content that is characteristic of aerated water far along the curve of FIG. 15 where any additional input of oxygen meets increased resistance. The consequence is that energy is wasted by attempting to crowd in a supply of additional oxygen molecules. This practice is herein termed "backmixing".

The manufacturer of the floating surface aerator shown in FIG. 3 was aware of this phenomenon and consequently provided the aerator with a variable-speed, horizontal-shaft rotor and an upstanding baffle and horizontally disposed splash pan behind the rotor "to prevent recirculation of freshly aerated fluid immediately back through" the rotor and in order to ensure that the rotor "is operating at all times at substantially its greatest efficiency, by receiving primarily that portion of the sewage liquid which has the lowest oxygen content". As illustrated in FIGS. 5, 6., and 11, the Carrousel surface aerator hurls outwardly a large amount of liquor, air froth, and bubbles over the surface on its intake side, and this mixture is promptly drawn downwardly and swept toward the intake of the aerator. Such an intake would occur even if the aerator were equipped with a draft tube creating toroidal circulation. Indeed, the entire bend in the channel, within which such a vertically shafted surface aerator is mounted, is in a complete-mix state having relatively uniform D.O.

content and consequently an aerator intake that pulls in a mixed liquor with a D.O. content not far below that desired as the product of the aeration zone (the hatched area in FIG. 5).

The directional-mix jet aerator system that is shown in FIG. 12 is also subject to backmixing, for it has been observed to be capable of recirculating into its intake a portion of the mixture of air bubbles and freshly aerated liquor ascending from its jets.

A schematic analysis of prior art practice with respect to back-mixing, intensive aeration of a contacted-flow portion, and no aeration of an induced-flow portion, followed by blending of the portions to produce the desired D.O. content, is presented in FIG. 16. This situation is inherent in prior art oxidation ditches because of:

(a) the lack of collecting or gathering means for forcing all of the mixed liquor at a selected low D.O. content to flow past the aerator, and
 (b) the lack of a means for inhibiting back-mixing of freshly aerated liquor into the pump/aerator intakes.

(6) Inability of fixed surface aerators to compensate for major depth variations Fixedly mounted rotor and disc aerators are highly sensitive to depth variations of even a few inches and typically possess no means for elevating or lowering their relatively massive bulks by more than a foot, so that floating assemblies, such as the aerator seen in FIG. 3, must be used when flow equalization is desired. Vertical-shaft surface aerators have been plagued by mechanical stresses to the shafts and shock-load difficulties for the impellers because of variable submergence. Submergence of all surface aerators, including the floating types, is deliberately varied only for desired changes in $O_2$ transfer, not for flow equalization or for velocity control. The oxidation ditches equipped with the floating horizontal-shaft rotors seen in FIG. 3, however, may be built with a cross-sectional configuration permitting considerable flow equalization.

(7) Inability of surface aerators to operate during adverse weather conditions All types of surface aerators, both fixed and floating, which have been installed in oxidation ditches have commonly been afflicted with aerosol spray and with severe icing on their surfaces during freezing weather. Only the directional-mix jet aerator is immune to weather conditions. Although the submerged turbine aerator (which is widely employed in aeration lagoons and complete-mix basins), is not affected by adverse weather conditions, it has not been used in oxidation ditches. In summary, prior art oxidation ditches provide zones for nitrification and denitrification but are so limited by propulsion capability and/or circulation rate and/or aeration capacity that their aeration devices must be disposed sequentially (in series) throughout the ditch and be spaced at distances apart that are based upon propulsion capabilities and/or circulation rates and/or aeration capacities without regard to lengths of the nitrification and denitrification zones. In other words, they are characterized by inherent rigidity and are incapable of adjusting to wide variations in flow rates and temperatures.

One reason therefor is that in prior art oxidation ditches the same aeration apparatuses supply the dissolved oxygen and create both induced flow and contacted flow of the mixed liquor so that elapsed times for circuit flow, oxygen supply, and aerobic/anoxic volume fractions are interrelated. For example, if the D.O. in a prior art oxidation ditch is too high, the aerobic zone is too long. If the oxygen supply is cut back in order to correct this situation, the flow velocity is simultaneously reduced. Yet a minimum flow velocity is required in order to maintain the bio-mass in suspension.

All of these enumerated problems have been satisfactorily solved by the inventions disclosed in the parent applications, Ser. No. 649,995 and Ser. No. 848,705, which provide a barrier means in sealed combination with a pump/aerator for:

(1) dividing the mixed liquor in the channel of an oxidation ditch into an intake body and a discharge body, with the pump/aerator as the sole flow-through connecting means so that:
    (a) flow of mixed liquor occurs only once each circuit flow through the pump/aerator,
    (b) back-mixing from the exit to the entrance of the pump/aerator is completely prevented, and
    (c) none of the flow in the channel is induced flow;
 (2) creating a differential head between the discharge body and the intake body on opposite sides of the barrier means and using it, particularly when the pump/aerator has no directional-flow discharge, for continuously moving the liquor in circuit flow through the channel from the discharge body to the intake body;
 (3) providing a mounting means for the pump/aerator so that all types of aerators can be mounted anywhere within the channel;
 (4) selectively providing controlled acceleration, uniform steady-state flow, and controlled deceleration for the liquor in the channel; and
 (5) providing a means for controlling the lengths of the aerobic and anoxic zones, independently of the flow velocity, while disposing all aeration apparatuses at a single location within the channel to obtain point-source aeration and point-source propulsion.

Essentially, the inventions disclosed in the parent applications solve these problems by providing point-source aeration and mixing with a means for gathering ALL of the mixed liquor, and thereby all of the floc particles, into at least one treatment center or passageway wherein or at the entrance or exit of which at least one pump means and at least one aeration means are disposed, whereby homogeneous aeration occurs, the pump means and aeration means being independently operable when an axial-flow pump is used for propulsion and a separate device is used for aeration (e.g., diffusers, jet aerators, and surface aerators). These inventions are generally referred to hereinafter as a barrier oxidation ditch.

The barrier, however, is useful for selective acceleration and deceleration, for providing homogeneous aeration, and for imparting an adequate hydraulic head to a desired volume of mixed liquor to propel it through distances unknown to the prior art, but it appears to be a hindrance with respect to conservation of momentum in the steady-state translational flow of the mixed liquor. As a demonstration of this concept, a barrier oxidation ditch having two impeller-type aerators, as described in Example 1 of Parent Application Ser. No. 848,705, has been observed to function as follows:

1) when the contents of the entire channel are quiescent and one pump/aerator is started, the other pump/aerator turns idly in reverse rotation; and
2) after about three minutes, the other pump/aerator slows, stops, and begins to turn idly in forward rotation.

A means for increasing flow efficiency of a directional-discharge barrier oxidation ditch by conserving its translational-flow momentum, while retaining accelerative and decelerative advantages of the barrier, is accordingly needed.

When an existing oxidation ditch of the looped-channel type, containing a plurality of spaced-apart aerators, is converted to a barrier oxidation ditch having point-source aeration, it is possible under certain conditions of food supply, F/M ratio, and temperature to have oxidation ditch dimensions so restricted and total oxygen demand so great that the largest single aeration device is inadequate and two or more suitably sized aeration devices cannot be installed in combination at one location. It therefore becomes necessary to have aeration devices located at more than one location in the channel, i.e., to have multi-source aeration. However, both point-source and multi-source aeration can be either homogeneous or heterogeneous. Homogeneous aeration, mixing, and propulsion simply require the use of a barrier as a gathering or collecting means to control the flow of the mixed liquor by forcing all of the mixed liquor to enter the discharge passage.

Nevertheless, it may be undesirable to have two barriers providing homogeneous mixing or aeration because it may be more desirable to conserve momentum. In other words, homogeneous aeration is more efficient in terms of energy consumption for mixing an oxygen-containing gas with the mixed liquor, but when two or more barriers are needed, it may be more desirable to have a selected degree of heterogeneous aeration, coupled with conservation of a selected amount of momentum, than to have homogeneous aeration at both barriers. Further, if homogeneous mixing is critical because of very high $NO_3$—N in the inflowing wastewater and because of a need for maximizing use of the available anoxic volume, it may be desirable to utilize a barrier to obtain homogeneous mixing of mixed liquor with raw wastewater and return sludge while compromising as to heterogeneous aeration in order to have conservation of momentum. A discharge passage is herein defined as a flow channel of smaller cross section than the endless channel of the oxidation ditch and through which the mixed liquor moves past a barrier disposed across the endless channel. A discharge passage includes a discharge duct, a discharge slot, a vertically disposed draft tube, and the like.

A barriered pump assembly is herein defined as any combination of: 1) a pump means for forcing mixed liquor to move through a discharge passage from an intake channel to a discharge channel and 2) a barrier means for forcing up to all of the mixed liquor to enter the discharge passage. If an aeration means is additionally provided, the term used herein is a barriered pump/aerator. If streams of raw wastewater and/or return sludge are connected to the discharge passage and no aeration is performed, the term used herein is a barriered pump/circulator.

The barrier means comprises: 1) at one extreme, a water barrier in combination with an extended intake baffle which is connected to the discharge passage, 2) at the other extreme, a complete barrier which sealably separates the intake channel from the discharge channel, being connected thereto solely by the discharge passage; and 3) intermediate therebetween, for example: (a) an adjustably apertured barrier assembly and (b) a combination of pump/aerators, connected in side-by-side relationship to form a barrier, and a jet-pump aerator which is disposed in flow connection with a flap-controlled opening through the barrier. However, a thin wall member which is disposed across the endless channel but which permits a relatively large amount of induced flow to pass by is herein termed a baffle.

SUMMARY OF THE INVENTION

It is therefore an object of this invention to provide circular-discharge aeration devices that minimize or inhibit back-mixing, provide directional-intake and directional-discharge propulsion, and are capable of being mounted anywhere within the channel of an oxidation ditch.

It is another object to provide a momentum conservation means for a directional-discharge barrier oxidation ditch. It is a further object to provide a means for combining directional-discharge aeration devices with circular-discharge aeration devices, both in series and in parallel, within the channel of a barrier oxidation ditch.

It is an additional object to provide an adjustable means for enabling induced flow of mixed liquor to move selectively past the barrier of any barrier oxidation ditch in order to adjust aerobic/anoxic volume fractions during unusual periods of inflow volume and/or food content and/or temperature.

It is also an object to provide a means for aerating all induced-flow liquor that is permitted to move past the barrier of a barrier oxidation ditch in order substantially to avoid unequal aeration of any portion of the mixed liquor.

It is a still additional object to provide a directional-discharge pump/aerator that when installed in an oxidation ditch without a physical barrier or baffle provides at least some of the advantages of a barrier oxidation ditch.

It is still further an object to provide an adjustably barriered aeration device having a selectively adjustable flow-control means for at least partially conserving the momentum of the circulating mixed liquor.

It is still another object to combine a barriered mixing/propulsion device for homogeneously mixing the inflowing wastewater and/or returned activated sludge with all of the mixed liquor circulating in an oxidation ditch by means of a separate barriered aeration device, a separate adjustably barriered device, or a separate nonbarriered aeration device to provide supplementary propulsion and point-source aeration within the channel of an oxidation ditch, preferably located halfway around the ditch.

In accordance with these objectives and the principles of this invention, an adjustable barrier is herein provided for a barrier oxidation ditch which comprises at least one induced-flow gateway therethrough and a means for selectively uncovering this gateway.

The adjustable barrier may be of any size, shape, or thickness, but, in the preferred embodiment, it is preferably a thin slab which is disposed uprightly athwart the channel and is sealably attached to the bottom and both sides of the channel for use in combination with at least one draft tube pump/aerator or pump/circulator having a vertically disposed downdraft tube which is connected to a curved discharge duct which curves in the downstream direction at a depth well below the bottom of the channel, finally ending in a recurved duct which is located just above the bottom of the channel. This barrier is preferably disposed about 1-3 duct diameters downstream of the intake funnel for the intake turbine or turbines.

As a means for selectively permitting induced flow to move past the barrier, thus conserving momentum of the continuously moving mixed liquor, a main flow area, having a selected height, is formed in the central part of the barrier, and a pair of auxiliary flow areas are selectively formed on the outer edges of the barrier. These flow areas are formed by lifting slide gates, which are preferably sealably disposed adjacent to rectangular openings in the barrier, to a desired height. A crank or other suitable lifting means is provided for lifting each slide gate.

When a directional-discharge pump/aerator has a length, L, measured from the impeller shaft to the end of the discharge duct, that is less than about three times the depth of the channel, the suction effect of its intake influences the liquor near the discharge end so that back-mixing tends to occur and acceleration to steady-state conditions is difficult, particularly in a large ditch. A semi-circular intake baffle is consequently provided for each downdraft turbine intake, being attached to its intake funnel and disposed above the funnel and athwart the direction of flow a short distance downstream of the impeller shaft. This baffle restricts the suction effect of the turbine to its upstream side.

However, when a directional-discharge pump/aerator has a L equal to or greater than about three times the channel depth, a "water barrier" tends to be created that is effective to minimize or inhibit back-mixing but which does not interfere with induced flow of liquor past the intake, thus conserving flow energy in the system. An increase in the ratio of impeller diameter to channel depth increases the necessary length of L in order to obtain an effective water barrier. Preferably, however, a baffle as shown in FIGS. 20 and 23 is provided at or near the downdraft turbine intake to improve the performance of the water barrier, especially in channels wherein the distance between the intake and discharge ends of the duct is less than three times the ditch depth.

As a means for minimizing unequal aeration of the mixed liquor, this invention includes the combination in parallel of directional-discharge aerators, such as downdraft submerged turbines ending in downstream-directed ducts, with circular-discharge aerators, such as high-speed and low-speed surface aerators, updraft submerged turbines, static aerators, and static mixer-aerators, which may be either fixed or floating. This combination is made by placing one or more circular-discharge aerators slightly upstream or downstream of the induced-flow passage, in the discharge passageway thereof, or at the discharge point of the passageway. Alternatively, an eddy-jet aerator is suitably aligned with the gateway through the barrier in order to aerate the induced-flow liquor passing therethrough. With any of these aerators adding oxygen to the induced-flow liquor, no portion of the mixed liquor need be aerated more intensively than another portion so that the post-blended energy input need be increased only very slightly, if at all, over homogeneous aeration of all of the liquor as a result of allowing some of the mixed liquor to pass through the barrier or past the directional-discharge aerator as induced flow, whereby momentum in the circulating mixed liquor is conserved.

It is also within the scope of this invention to provide any circular-discharge aerator with a pair of baffles, the concave side of one baffle being disposed downstream of the intake and facing upstream, the concave side of the other baffle being disposed upstream of the discharge and facing downstream, the vertical location of each with respect to the other being irrelevant and the two baffles being connected by a horizontal barrier of generally circular shape and having a central hole therein through which the mixed liquor is pumped. Such aerators are herein termed dual-baffle aerators and are highly suited for receiving and aerating the induced-flow liquor passing through a flow area around or by a barrier. They have directional-discharge characteristics but are not herein classified as directional-discharge aerators.

It is additionally within the scope of this invention to dispose a plurality of such dual-baffle aerators within the channel of an oxidation ditch in side-by-side connected relationship across the channel to form a barrier and/or in staggered relationship along the length of the channel to form an aerator system so that the induced-flow liquor moving past one aerator becomes at least a part of the intake liquor for the next dual-baffle aerator. These dual-baffle aerators are preferably connected by barriers having flow areas and slide gates, but it is feasible to utilize such a system without barriers by sacrificing speed of acceleration from quiescent conditions and speed of deceleration to quiescent conditions.

It is further within the scope of this invention to attach a dual-baffle aerator to a side of the channel of an oxidation ditch and to flair the side of the channel to form a discharge slope so that intake and discharge patterns are improved. Such a side-attached aerator is highly suited to receive the induced-flow liquor passing through one of the auxiliary flow areas along the side of an adjustable barrier. Moreover, a side-attached aerator is adapted to form a part of an aerator system in combination with dual-baffle aerators which are disposed in the main part of the channel.

When an aerator system is utilized in an oxidation ditch without a barrier, however, it is preferable to substitute a directional-discharge aerator for one of the dual-baffle aerators, i.e., to combine one directional-discharge aerator with a plurality of dual-baffle aerators and side-attached aerators so that most of the circulatory pumping is done by the directional-discharge aerator. Controlling and maintaining an adequate velocity for suspension of mixed liquor solids and controlling acceleration and deceleration is difficult without either a barrier or a directional-discharge pump/aerator.

Static aerators and static mixer aerators can be combined in an array, each passing through and sealably attached to a horizontally disposed barrier which is attached along its upstream and downstream edges to a pair of concave baffles, the lower baffle facing upstream and the upper baffle facing downstream. Alternatively, the horizontally disposed barrier may be a part of the floor of the channel and be provided with an individual depression or intake body thereunder, the downstream edge of the depression forming the upstream-facing concavity and the depression having a gradually deepening approach slope on its upstream side.

Dual-baffle aerators are versatile flow-directing units that are adaptable to many situations requiring the production of translational flow of liquid within a channel.

They thus perform as circulators within the channel of an oxidation ditch which is herein defined as encompassing both shallow and deep basins, whether circular, oval, or looped in any endless configuration.

Side-attached dual-baffle aerators are preferably equipped with low-speed turbine aerators that pump discharge flow with significant tangential velocity. Thus, on the right side of the channel, looking downstream, it is preferable that the impellers rotate clockwise, but on the left side it is preferable, in plan view, to have counterclockwise rotation in order to obtain maximum tangential discharge in deeper water and to be able to induce noncontacted liquor to move at a desired velocity.

The discharge slope that is disposed downstream of a dual-baffle aerator should have a slope to the channel bottom in order to prevent solids deposition and accumulation. This discharge slope can be formed of any convenient material having resistance to erosion.

A point-source aeration process for efficiently utilizing the total volume of mixed liquor which is available in the endless channel of an oxidation ditch for: (a) oxidizing $NH_3$—N in an inflowing raw wastewater to form nitrate ions by biological nitrification within an aerobic zone, (b) oxidizing five-day biochemical oxygen demand of said wastewater within both said aerobic zone and an anoxic zone, each zone containing a portion of the total volume of said mixed liquor moving translationally within said endless channel, and (c) denitrifying said nitrate ions within said anoxic zone, said process comprising the following steps:

A. pumping said mixed liquor from an intake portion of said channel through at least one discharge passage and into a discharge portion of said channel, which is also a portion of said aerobic zone, at a sufficient rate to propel said mixed liquor at a translational velocity of at least about one-half foot per second through said endless channel;

B. homogeneously aerating the pumped mixed liquor with sufficient dissolved oxygen to create said aerobic zone, wherein:
  (1) a remaining portion of said five-day biochemical oxygen demand is oxidized by a first portion of the dissolved oxygen.
  (2) substantially all of said $NH_3$—N is oxidized by a remainder portion of said dissolved oxygen to form nitrate ions, and
  (3) consumption of said first portion and said remainder portion of said dissolved oxygen throughout said aerobic zone progressively decreases said dissolved oxygen to 0.5 mg/l as the end of said aerobic zone where said anoxic zone begins;

C. maintaining said end of said aerobic zone at a preselected location during usual variations in operating conditions;

D. slightly downstream of said location, homogeneously admixing a portion of or up to substantially all of said raw wastewater with said mixed liquor in order to utilize substantially all of said anoxic zone and substantially all of said mixed liquor therewithin for:
  (1) denitrifying said nitrate and nitrate ions, whereby oxygen in said ions is biochemically utilized for oxidation of organic and inorganic food sources,
  (2) utilizing up to a theoretical maximum of 62.5 percent of the chemically available oxygen for oxidizing the initial portion of said five-day biochemical oxygen demand in said raw wastewater, said anoxic zone being spaced from said intake channel portion and succeeded in the direction of flow of said translationally moving mixed liquor by an oxygen-deficient zone which includes said intake channel portion, said mixed liquor within said oxygen-deficient zone having substantially no dissolved oxygen and no nitrate, nitrite, sulfate, or other ions as a source of chemically available oxygen, whereby a luxury uptake rate of dissolved oxygen occurs during aerating of said pumped mixed liquor in said Step A.

During periods when abnormal operating conditions exist and the end of the aerobic zone can no longer be maintained at the selected location, the mixing device is preferably moved upstream or downstream within the channel to a new location which is at or preferably slightly downstream of the end of the aerobic zone.

The quantity of sludge that is returned to the endless channel from the sludge outlet of the clarifier is insignificant, even at 100 percent sludge return. This statement can be appreciated by considering that: (1) the F/M weight ratio in an oxidation ditch is typically 0.05 pound of 5-day biochemical oxygen demand per pound of microorganisms, and (2) at dilution ratios of 100:1 to 200:1 or greater, the return sludge (containing, at 100 percent return, all of the microorganisms in the outflow to the clarifier which volumetrically equals the inflowing wastewater under steady-state conditions) is therefore no more than 0.5 percent to 1 percent of the microorganisms in the mixed liquor in the channel at the point of sludge return. It is therefore logical that it is really inconsequential whether or not these microorganisms in the sludge are introduced into the pump/circulator to compete with the microorganisms in the mixed liquor for the already insufficient amount of food in the inflowing wastewater. Doing so, however, is preferred. It is alternatively quite satisfactory to feed this return sludge to the pump/aerator or to distribute it at the beginning of the oxygen-deficient zone.

De-aerating chemicals may also be added to the mixed liquor at the beginning of the anoxic zone in order to decrease the dissolved oxygen content thereof. Sodium sulfite, for example, may be used for this purpose.

BRIEF DESCRIPTION OF THE DRAWINGS

The invention may be more fully understood by referring to the drawings in which FIGS. 1-16 refer to the prior art.

FIG. 1 is a sectional elevation of a horizontal-shaft rotor, with radially extending blades, which operates in a channel deeper than seven feet and requires a baffle at a downstream distance of 4-15 feet.

FIG. 2 is a sectional elevation of an oxidation ditch equipped with six horizontal-shaft rotors, alternate rotors being idle, in which hatched areas indicate zones having 0.5-1.5 mg/l of dissolved oxygen (D.O.) and unhatched areas indicate less than 0.5 mg/l D.O.

FIG. 3 is a perspective view of a floating surface aerator which is equipped with a horizontal-shaft blade rotor and a deflecting member or baffle to prevent recirculation of freshly aerated liquor under the rotor a second time for further aeration.

FIG. 4 is an end view of a horizontal-shaft disc aerator which rotates at the surface of mixed liquor in a channel of an oxidation ditch, the discs being provided with many holes which lift liquor into the air and bring air beneath the surface.

FIG. 17 is a sectional elevation of a flow-control apparatus in a barrier oxidation ditch, as described in Example 1 of parent application Ser. No. 848,705, which provides homogeneous aeration of all of the mixed liquor, by means of a sparge ring beneath the impeller and a diffuser within the discharge duct, and homogeneous mixing of returned sludge with all of the mixed liquor that is flowing through the channel of the ditch.

FIG. 18 is the same sectional elevation as seen in FIG. 17, but without aeration devices, to provide homogeneous mixing of return sludge and of raw wastewater with all of the mixed liquor.

FIG. 19 is the same sectional elevation as seen in FIG. 18, but without the barrier, wherein a sufficiently long extension is attached to the discharge end of the discharge duct to create a water barrier and to provide heterogeneous mixing of return sludge and of raw wastewater with the mixed liquor.

FIG. 20 is the same sectional elevation as seen in FIG. 19, wherein a sparge ring is disposed beneath the impeller to provide heterogeneous aeration and heterogeneous mixing of return sludge with the mixed liquor and wherein an extended intake baffle is attached to the intake funnel atop the downdraft tube to provide more efficient intake of mixed liquor.

FIG. 21 is a perspective view of the extended intake baffle of FIG. 20.

FIG. 22 is a side elevation of a flow-control apparatus comprising a barrier and a pump/aerator which comprises an axial-flow impeller, a short draft tube within which the impeller operates, a direction-changing duct which rests upon the bottom of the channel of an oxidation ditch, and the barrier which is disposed downstream of the intake funnel and is sealably attached to the pump/aerator and to the bottom and sides of the channel in order to provide homogeneous aeration and homogeneous mixing of return sludge with all of the mixed liquor.

FIG. 23 is the same sectional elevation as seen in FIG. 22 but without the barrier and the aeration means, so that the pump/circulator provides heterogeneous mixing of return sludge and raw wastewater with the mixed liquor.

FIG. 24 is a sectional elevation of a flow-control apparatus comprising a hollow barrier having a plurality of tubular openings therethrough, an axial-flow impeller being mounted in each opening and a plurality of directional-mix jet aerators (eddy jets) being disposed around each opening.

FIG. 25 is a sectional plan view of the apparatus seen in FIG. 24, looking in the direction of the arrows crossing the line 25—25 in FIG. 24.

FIG. 26 is an end view, looking downstream at the lower portion of the barrier in FIGS. 24 and 25.

FIG. 27 is an end view of another embodiment of the apparatus seen in FIGS. 24-26, wherein the impellers are mounted in a slot having opposed jets in its sides.

FIG. 28 is a sectional elevation of a flow-control apparatus, comprising a barrier underlain by a curved flow slot and a header, to which a plurality of directional mix jet aerators (eddy jets) are attached, which is disposed in the flow slot and which may be withdrawn through a vertical slot in the barrier, whereby the jets provide homogeneous aeration to all of the mixed liquor.

FIG. 29 is a top view of the barrier and vertical slot of FIG. 28.

FIG. 30 is a sectional elevation of a flow-control apparatus comprising a vertically disposed adjustable barrier extending partially toward the bottom of a flow depression in the bottom of the channel of an oxidation ditch, a header for a plurality of directional mix jet aerators (eddy jets), and an inclined flow-directing baffle which is disposed above the jet plume of the aerators, whereby a maximum degree of homogeneous aeration is provided while conserving momentum.

FIG. 31 is a top view of the apparatus of FIG. 30.

FIG. 32 is a front elevation of an adjustably apertured barrier, which is operably attached to the bottom and sides of the channel of an oxidation ditch, and a pair of directional-discharge submerged draft tube pump/aerators, looking downstream from the intake body of mixed liquor.

FIG. 33 is a sectional side elevation of the adjustably apertured barrier and directional-discharge aerators of FIG. 32, taken in the direction of the arrows crossing the line 33—33 in FIG. 32.

FIG. 34 is a sectional plan view, taken in the direction of the arrows crossing the line 34—34 in FIG. 32, of the adjustably apertured barrier, draft tubes, intake funnels, and intake baffles seen in FIGS. 32 and 33.

FIG. 35 is a perspective view of a concave baffle and intake funnel connected to a draft tube.

FIG. 36 is a perspective view of a dual-baffle aerator comprising a pair of oppositely facing concave baffles, a circular horizontal barrier, and a high-speed floating surface aerator.

FIG. 37 is a side view of the dual-baffle aerator seen in FIG. 36.

FIG. 38 is a rear view, looking upstream from the middle of the channel, of the dual-baffle aerator seen in FIGS. 36 and 37.

FIG. 39 is a plan view of an aerator system comprising a trio of dual-baffle surface aerators of the type shown in FIGS. 36-38 in staggered array within the channel of an oxidation ditch.

FIG. 40 is a plan view of an oxidation ditch in which multi-source propulsion and aeration are supplied with two pairs of the dual-baffle aerators seen in FIGS. 36-38.

FIG. 41 is a plan view of a side-attached dual-baffle aerator comprising a concave baffle facing upstream and attached to the bottom and sloping side of the channel, a horizontal barrier, a flow-directing baffle facing upstream, and a low-speed updraft turbine-type aerator which is supported by three floats.

FIG. 42 is a plan view of a flow directing unit or a single-baffle aerator comprising an array of static mixer-aerators which are sealably attached to a horizontal baffle.

FIG. 43 is a side view of the single-baffle aerator of FIG. 42.

FIG. 44 is a perspective view of a dual-baffle aerator comprising a pair of oppositely facing concave baffles, a circular horizontal barrier, a discharge slope downstream of the lower baffle, and a floating low-speed surface aerator.

FIG. 45 is a plan view of a barrier oxidation ditch in which a barrier and axial-flow pump, as seen in FIG. 17, are combined with a directional-discharge pump/aerator, as seen in FIG. 19.

FIG. 46 is a plan view of a barrier oxidation ditch in which a barrier and axial-flow pump are combined with an adjustably apertured barrier, as seen in FIGS. 32-35.

FIG. 47 is a plan view of the same ditch as seen in FIG. 46 except that the mixing and aerating functions of the barrier devices are reversed FIG. 48 is a plan view of a barrier oxidation ditch having two adjustably barriered devices.

FIG. 49 is a plan view of a barrier oxidation ditch having one adjustably apertured barrier device, as seen in FIGS. 32-35, with a pair of dual-baffle aerators that are connected by a barrier having an adjustable aperture at the bottom only in combination with a directional-mix jet aerator header.

FIG. 50 is a sectional elevation looking in the direction of the arrows crossing the line 50—50 in FIG. 49.

FIG. 51 is a plan view of a barrier oxidation ditch of the looped channel type in which a barrier in combination with one pair of axial-flow turbines and discharge ducts, as seen in FIG. 17, supplies most of the propulsion and three pairs of directional-discharge pump/aerators, as seen in FIG. 19, are spaced along successive straight portions of the channel to supply additional propulsion and aeration in an extended aerobic zone.

DESCRIPTION OF THE PREFERRED EMBODIMENTS

Figure 17:
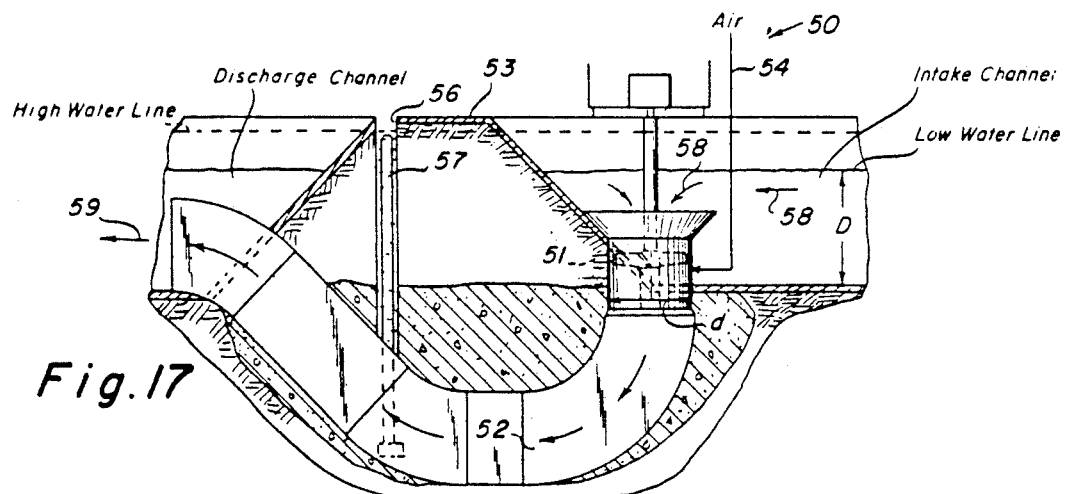
FIG. 17 shows a pump/aerator as described in parent application Ser. No. 848,705.

FIG. 17 shows a barrier oxidation ditch apparatus 50, as disclosed in parent application Ser. No. 848,705, comprising an impeller 51 of an axial-flow pump of the submerged-turbine type which operates within a downdraft tube having at its upper end an intake funnel and at its lower end a discharge duct 52 which is shaped like a meerschaum pipe (but herein termed a U-tube). An air-supplied sparge ring is disposed beneath the impeller as an aeration means, air being delivered by air supply line 54. Discharge duct 52 curves beneath the channel and beneath an earthen barrier 53 which contains a vertically disposed well, formed by a casing pipe 56 which is sealably attached to the top of duct 52 and within which an air delivery line 57, having a sparge tube at its lower end, is removably inserted. Intake flow 58, representing the total flow in the channel, enters the funnel, is pumped by impeller 51, is promptly aerated, and leaves duct 52 as aerated flow 59, whereby the air is homogeneously mixed with the mixed liquor.

Figure 18:
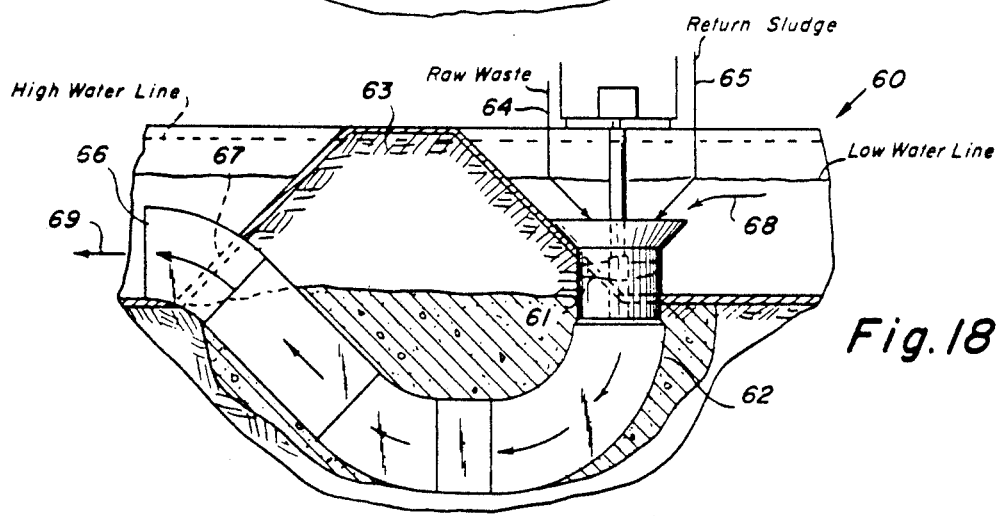
FIGS. 18-51 show various embodiments of this invention.

The functions of the barrier oxidation ditch apparatus 60 that is shown in FIG. 18 are propulsion and homogeneous mixing, not aeration. The apparatus is the same as apparatus 50 except that (1) there is no aeration means and (2) raw wastewater is fed to the space above impeller 61 through line 64 while return sludge is fed to the same space through line 65. Intake liquor 68, necessarily representing all of the mixed liquor in the channel because barrier 63 blocks the channel, moves through discharge duct 62 to become homogeneously mixed liquor 69. Exit end 66 of duct 62 is alternatively cut off in parallel with the barrier surface along line 67 to provide upward discharge of the mixed liquor.

Figure 19:
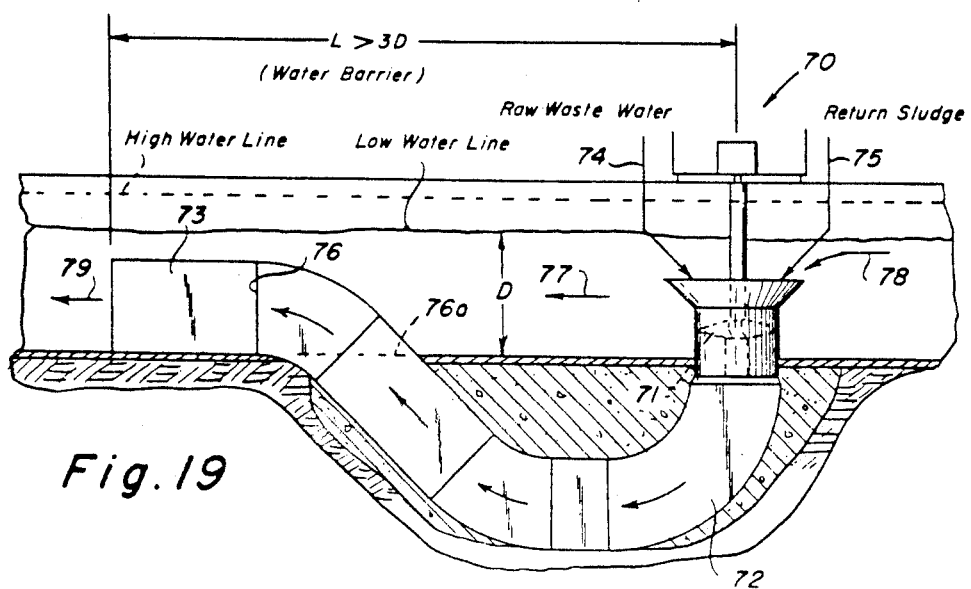

The function of the directional-discharge apparatus 70 seen in FIG. 19 is to impart propulsive energy to an intake portion 78 of the mixed liquor and to provide heterogeneous mixing of this portion 78 with raw wastewater in line 74 and with return sludge in line 75, after blending of induced flow 77 with discharge flow 79. Both lines 74, 75 discharge into the space above impeller 71.

Extension 73 of any necessary length may be added to end 76 of U-shaped discharge duct 72 in order to create a sufficiently long "water barrier", i.e., the minimum distance along the channel in which a mass of water, even though flowing at a velocity that prevents settling of suspended solids, provides isolation between the suction effects of the funnel and the discharge of aerated liquor 79. The depth, D, of the liquor in the channel can be used as an estimate of the required distance between the shaft for impeller 71 and the end 76 of discharge duct 72 that is needed to create this water barrier. As seen in FIG. 19, this distance is at least three times the depth, D, of mixed liquor in the channel. Alternatively, vertically disposed end 76 may be replaced with horizontally disposed end 76a, which is flush with the bottom of the channel, in order to promote vertical blending of flow 79 with flow 77.

Figure 20:
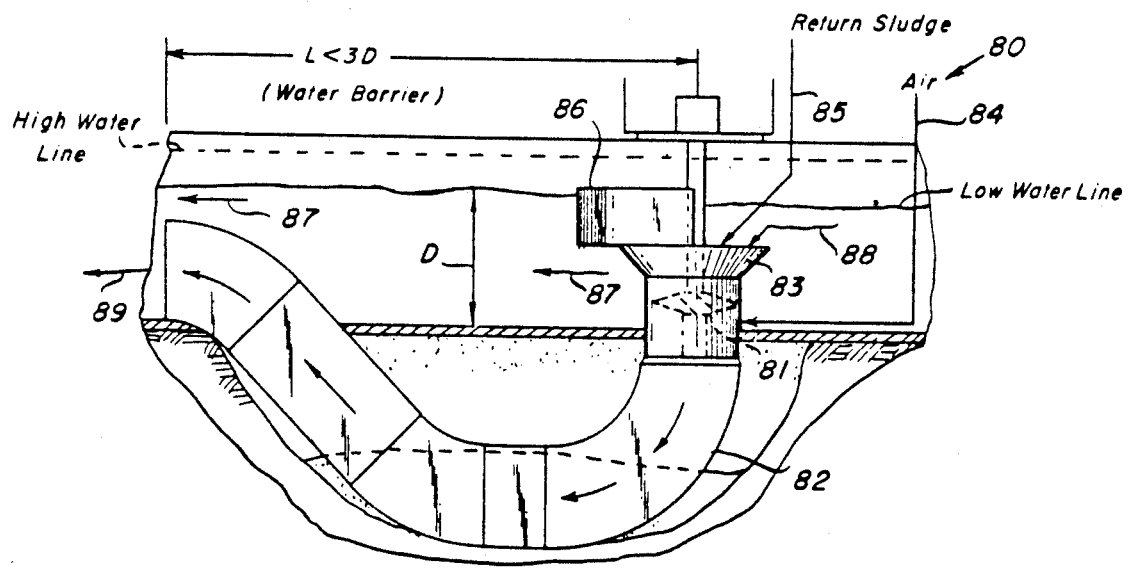
Figure 20A:
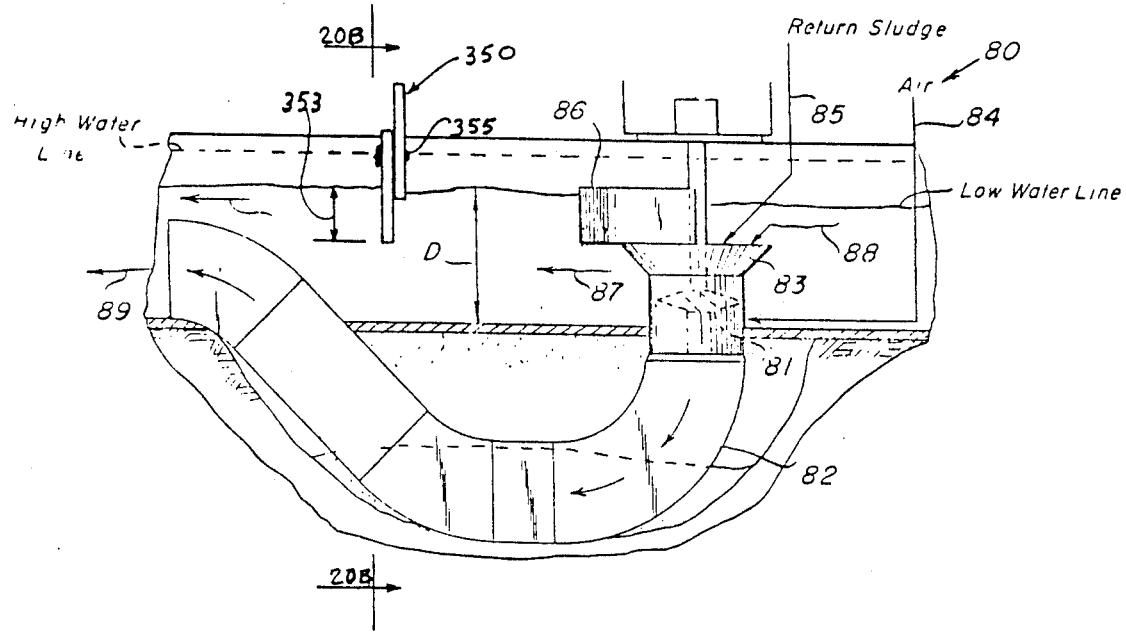
FIG. 20A is the same sectional elevation as seen in FIG. 20, wherein an adjustable baffle is attached to the sides of the channel for controlling the amounts of induced flow and backmixing.
Figure 20B:
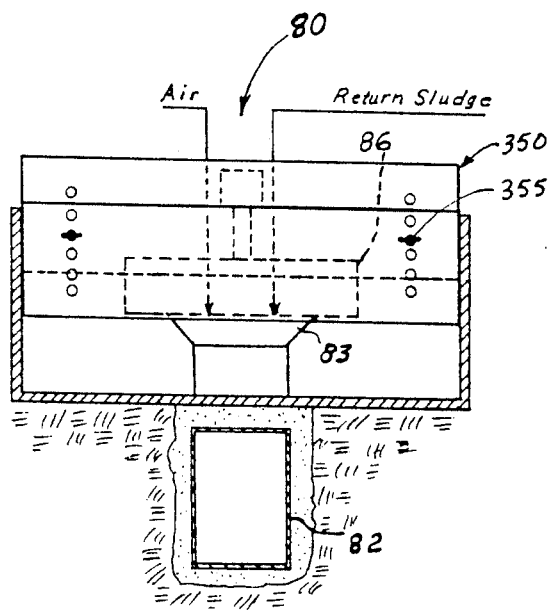
FIG. 20B is a sectional elevation that is transverse to the channel, taken in the direction of the arrows 20B—20B in FIG. 20A.

The functions of the directional-discharge pump/aerator 80 seen in FIG. 20 are to provide propulsion, heterogeneous aeration, and mixing. This is accomplished by aerating intake flow 88 with air in line 84 and mixing intake flow 88 with return sludge in line 85 by means of impeller 81 and then, after passage through discharge duct 82, blending discharge flow 89 with induced flow 87. Extended intake baffle 86, mounted atop intake funnel 83, assists in gathering intake flow 88, minimizes back-mixing possibilities, and reduces the need for an extensive water barrier when starting up after shutdown of the oxidation ditch. As illustrated in FIGS. 20A, 20B for pump/aerator 80, any pump/aerator or pump/circulator of this invention may be selectively combined with an adjustable baffle 350 which may be attached to the sides of the channel, as seen in FIGS. 20A, 20B, or which may be attached directly to the pumping apparatus. Baffle 350 may also be selectively provided with holes for passing additional induced flow through the upper part of the channel, relatively near to the surface of the mixed liquor. Baffle 350 has a width that extends from side to side of the channel and a height that produces a selected depth 353. Its function is selective restriction of the relatively large amount of induced flow 87 that passes by a pump/aerator or pump/circulator, having no other barrier than a water barrier, for the purpose of momentum conservation. Baffle 350 comprises bolts and wingnuts 355 which enable depth 353 to be selected.

Figure 21:
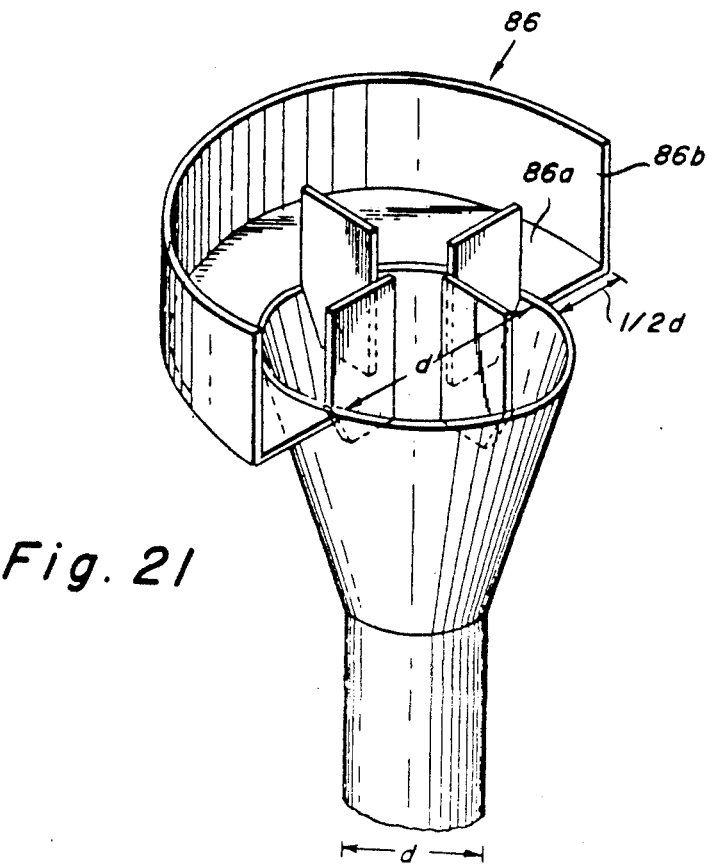

Extended intake baffle 86 is shown in perspective in FIG. 21. Intake funnel 83 has an upper diameter, d', and intake baffle 86 comprises a vertically disposed concave member 86b and a horizontally disposed platform member 86a which has a width of at least d'/2. Member 86b can have any concave shape, such as paraboloidal, semi-elliptical, or semi-circular, and its ends can extend upstream as far as desired.

Figure 22:
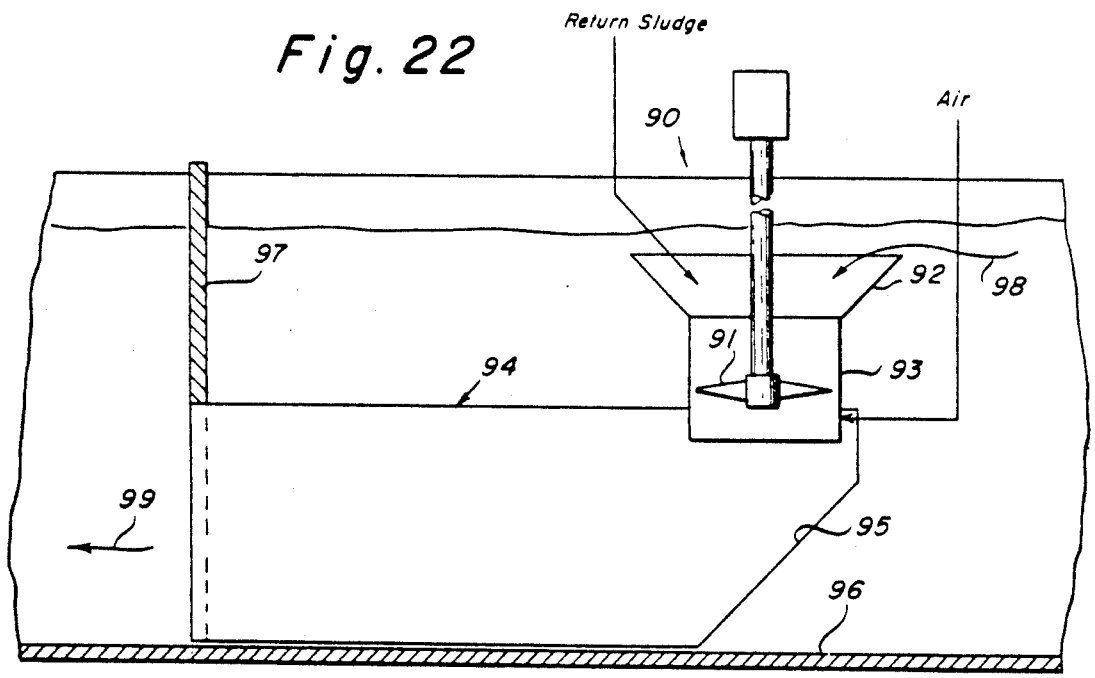

The barrier oxidation ditch apparatus 90 in FIG. 22 is suitable for prefabrication and lowering, as with a crane, into the channel of an existing oxidation ditch or into another type of existing aeration system to convert it into an oxidation ditch. The reason therefor is that apparatus 90 merely rests upon bottom 96 of the channel or other system or is supported from the top of the channel.

Apparatus 90 comprises a motor, shaft, and impeller 91, an intake funnel 92, a short downdraft tube 93 within which impeller 91 operates, a discharge duct 94 having a flow-turning surface 95 and sufficient length for maintaining the liquor and air in contact for a desired elapsed time, and a barrier 97 which is sealably attached to duct 94 and to the sides and bottom 96 of the channel. Barrier 97 is suitably prefabricated and welded to duct 94 prior to its placement in the channel.

Intake flow 98, all of the mixed liquor in the channel, enters funnel 92, is mixed with air and return sludge within downdraft tube 93 by impeller 91, is deflected 90° by surface 95, and moves through duct 94 as aerated discharge flow 99. The functions of apparatus 90 are thus homogeneous aeration, homogeneous mixing of return sludge with mixed liquor, and propulsion.

Figure 23:
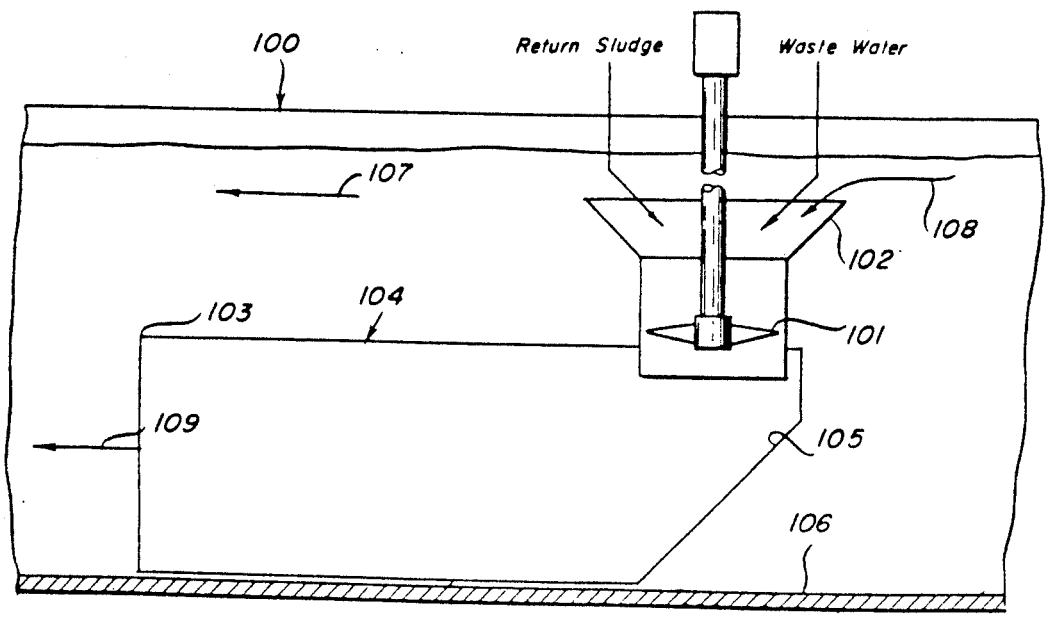

Pump/circulator 100, shown in FIG. 23, has exactly the same funnel 102, impeller 101, discharge duct 104 having flow-turning surface 105 and discharge end 103 as the apparatus 90 seen in FIG. 22. Intake flow 108 is mixed with return sludge and raw wastewater and emerges from end 103 as discharge flow 109 which blends with induced flow 107. The functions of pump/circulator 100 are propulsion and heterogeneous mixing of mixed liquor with raw wastewater and return sludge. A baffle (not shown in FIG. 23) can extend from side to side of the channel and be slideably extended downwardly to restrict the quantity of induced flow 107. Both apparatus 90 and pump/circulator 100 are well suited for mixing applications because their operating depths above channel floor 96, 106 are minimal, and pump/circulator 100 is particularly well suited therefor because its heterogeneous operation incurs no economic penalty. It is also well adapted to be fitted with an extended intake baffle 86.

Figure 23A:
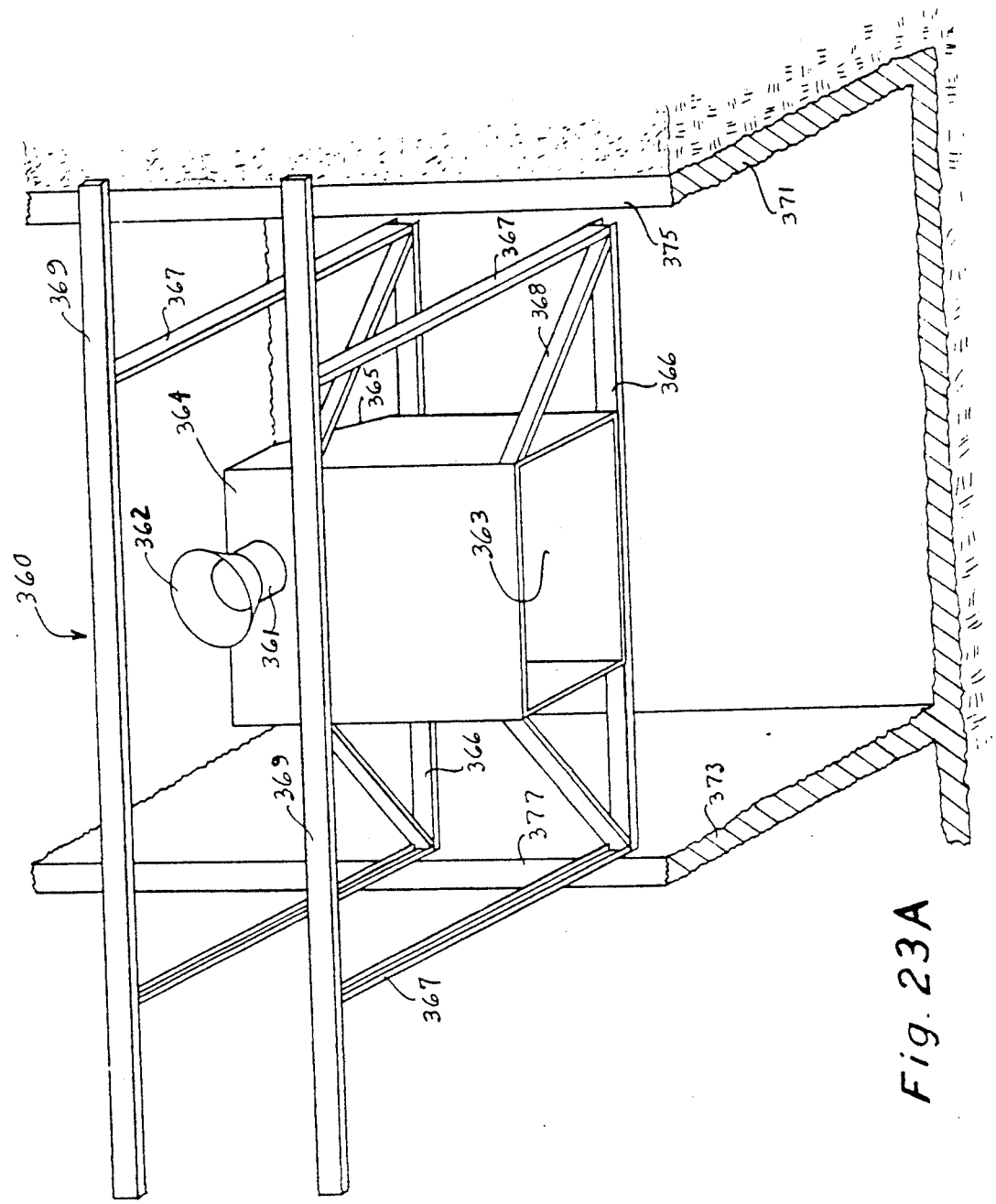
FIG. 23A is a perspective view that shows the pump/circulator of FIG. 23 being lowered, as with a crane, into the channel of an oxidation ditch.

FIG. 23A shows pump/circulator 360 being lowered, as with a crane, into the channel of an oxidation ditch. The channel has outer side 371 and central partition 373 having respective tops 375, 377. Pump/circulator 360 is exactly the same as apparatus 100 and comprises a funnel 362, a downdraft tube 361, and a rectangularly shaped discharge duct 364 having a flow-turning surface 365 and a discharge end 363. A support assembly, comprising stringers 367, attached to overhead beams 369 and to bottom beams 366 and braced by compression struts 368, enables pump/circulator 360 to be supported by tops 375, 377.

Figure 24:
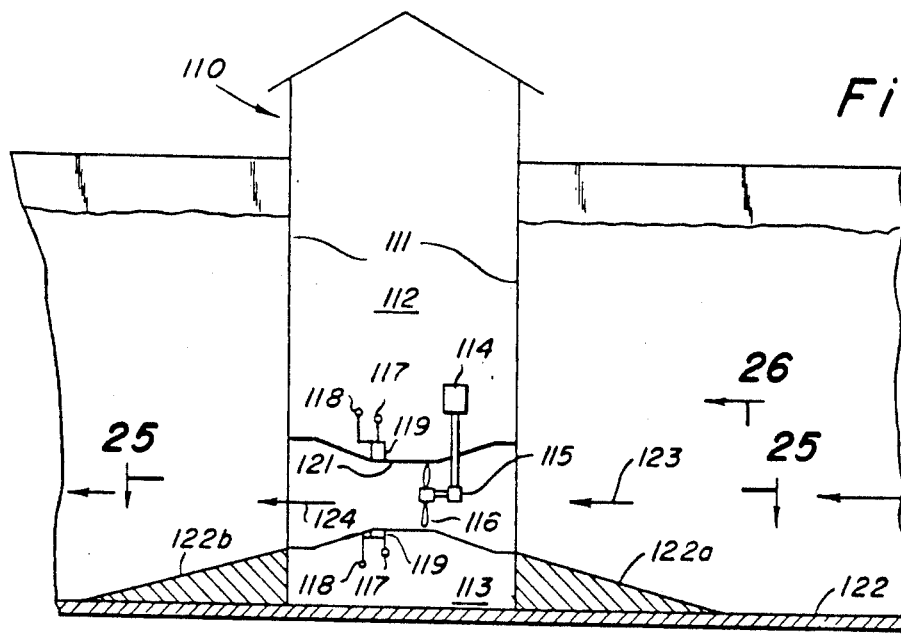
Figure 25:
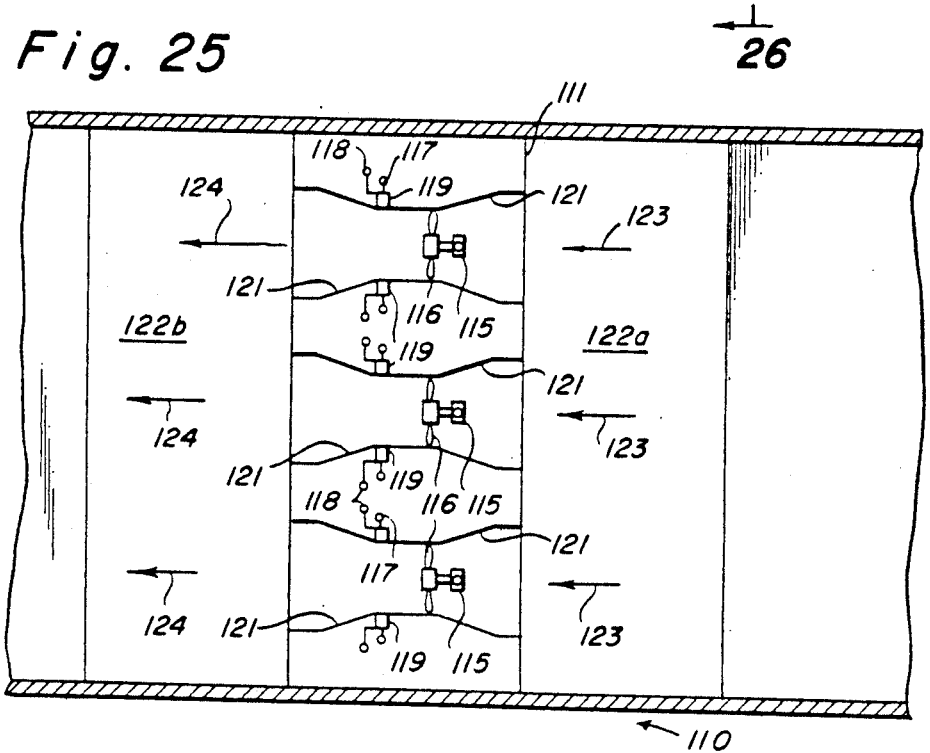
Figure 26:
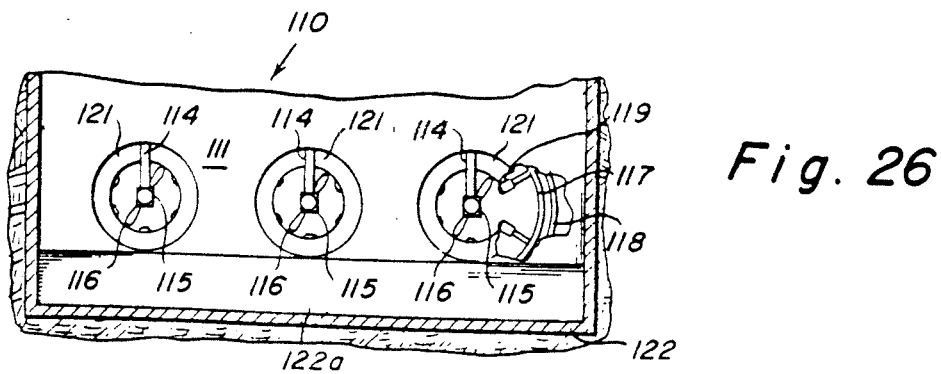

The barriered eddy jet apparatus 110, seen in FIGS. 24-26, inherently has the functions of propulsion and homogeneous aeration, although supply lines for raw wastewater and/or return sludge can be added, preferably upstream of impellers 116. The device is thus readily classified as a pump/aerator and as being suitable for independently controlling propulsion and aeration. It is also suitable for prefabrication and lowering into the channel of an oxidation ditch or onto the floor of another aerobic system, such as a complete-mix tank. The barrier has opposed sides 111 which are spaced apart to define an access well 112 and a lower working space 113 beneath a row of transversely disposed ducts 121 which are near channel bottom 122. Access well 112 and working space 113 are conveniently covered with a roof and drained by a sump pump.

As seen in FIGS. 25 and 26, each duct 121 has an impeller 116, preferably mounted within or upstream of the venturi neck and connected to an angle bearing 115 which is connected to a motor and shaft 114. A plurality of jets 119 are convergingly disposed around each venturi duct 121 and slightly downstream of impellers 116, being supplied by liquid headers 117 and air headers 118. Sides 111 are fitted with approach slope 122a and discharge slope 122b which rest upon bottom 122. The dimensions of ducts 121 are such that all of the intake flow 123 is thoroughly mixed with air to produce homogeneous aeration as discharge flow 124 which can be controlled as desired by varying the speed of the impellers.

Figure 27:
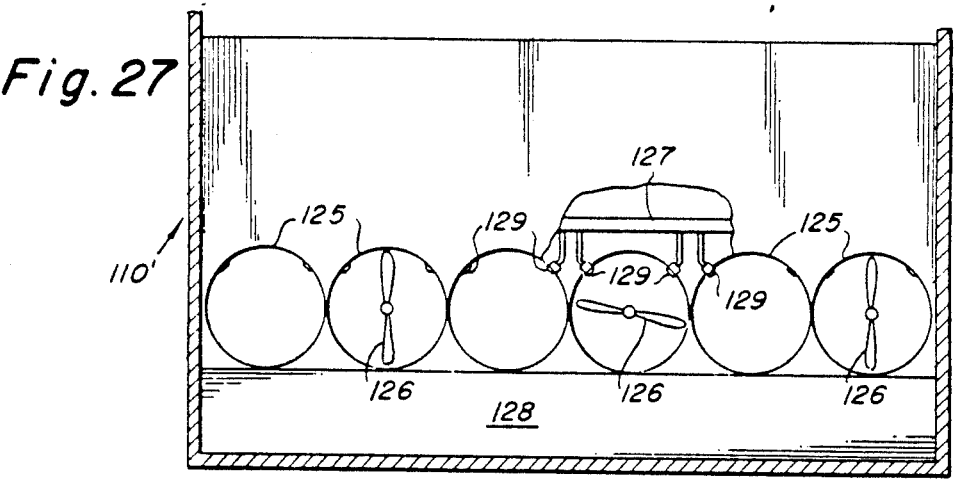

A slightly different embodiment 110' of the pump/aerator apparatus 110 of FIGS. 24–26 is shown in FIG. 27 as an end view only, similar to FIG. 26. In FIG. 27, the plurality of venturi ducts 121 are replaced with a row of straight parallel tubes 125 which are embedded side-by-side in concrete and aligned with the channel near the bottom of the barrier. An approach slope 128 leads from the floor of the channel to the bottom entrance edges of tubes 125. Directional mix jet aerators 129 discharge transversely, or at a downstream angle of up to about 45°, into each tube 125. Jets 129 are mounted along the upper surfaces of tubes 125 and are connected to air and liquid headers 127 which can be serviced from an access well within the barrier. Alternate tubes 125 are also equipped with impellers 126. A portion of the mixed liquor within the intake channel moves through the other tubes by induced flow, and the remainder is propelled by impellers 126; yet all of the mixed liquor entering the discharge channel is aerated.

Figure 28:
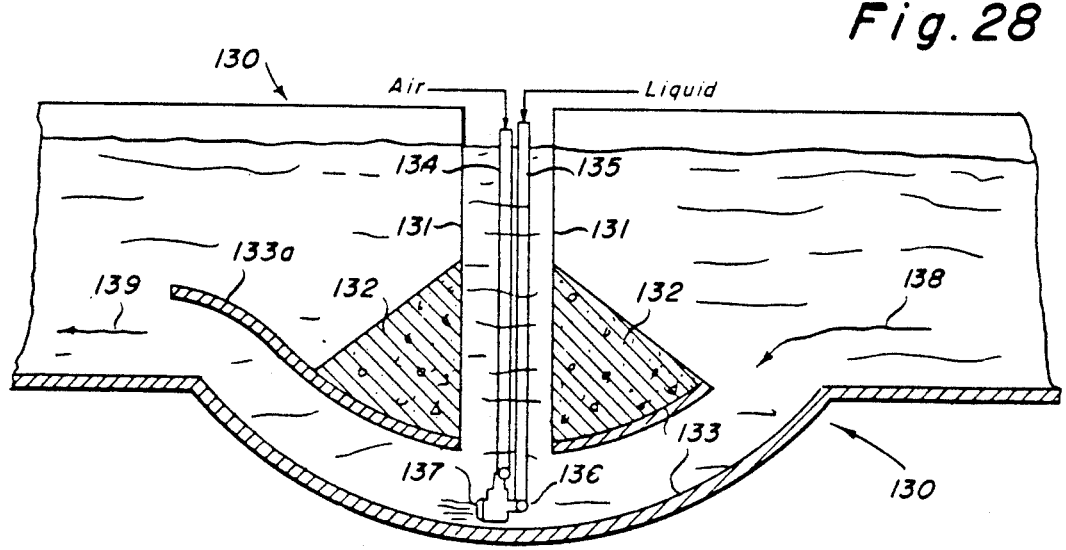
Figure 29:
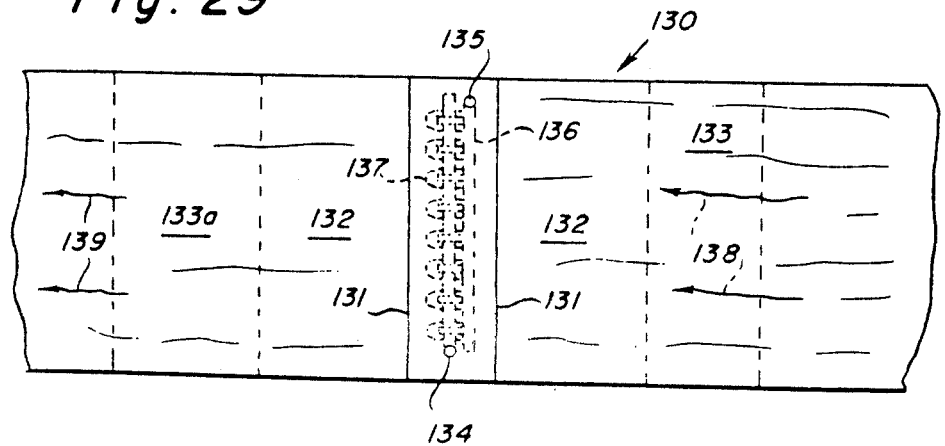

The eddy-jet barriered pump/aerator 130, shown as a sectional elevation in FIG. 28 and as a plan view in FIG. 29, comprises a barrier which is formed by vertical sides 131 and by a pair of triangularly shaped slot shapers 132. Sides 131 are spaced apart to define an access well, normally filled with mixed liquor to channel depth, and are rigidly attached to the sides of the channel. Shapers 132 are attached to and supported by sides 131 and are conveniently made of a lightweight material, such as foamed concrete.

The bottom of the channel is deepened beneath the barrier and is substantially in parallel to the bottom surfaces of slot shapers 132 to form a discharge slot 133 having downwardly curved and then upwardly recurved sides which end in a discharge portion 133a having as much length as desired to obtain maximum benefit of the jet plumes therewithin.

These jet plumes are formed by a plurality of directional mix jet aerators (eddy jets) 137 which are mounted on a header 136, supplied by an air delivery line 134 and by a liquid delivery line 135. Intake flow 138 enters the intake end of slot 133 and emerges as discharge flow 139.

Figure 30:
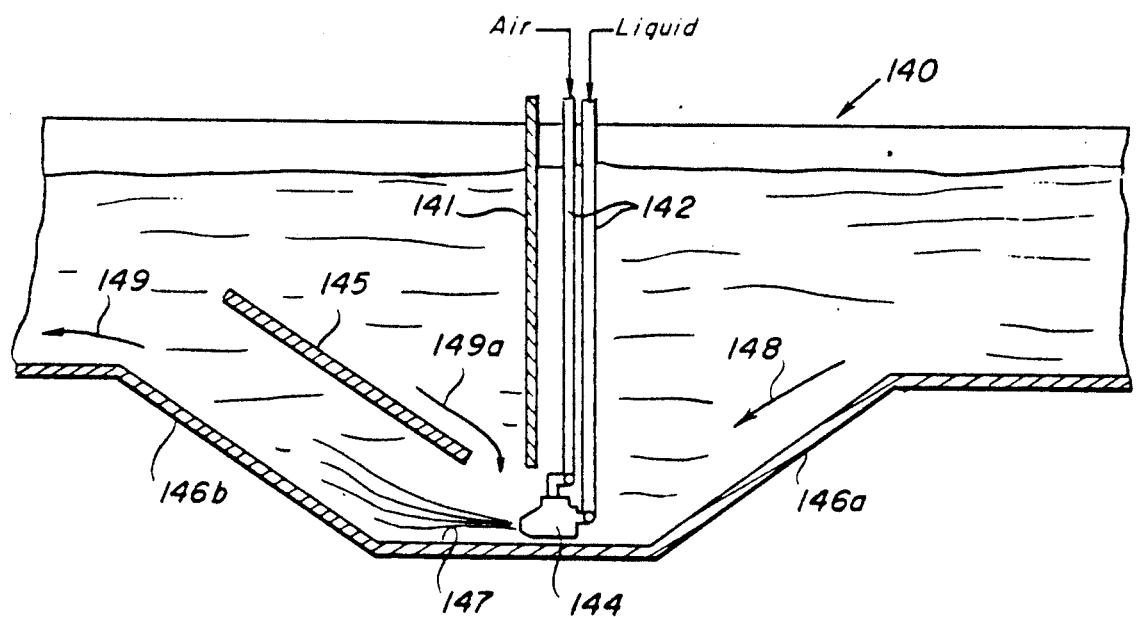
Figure 31:
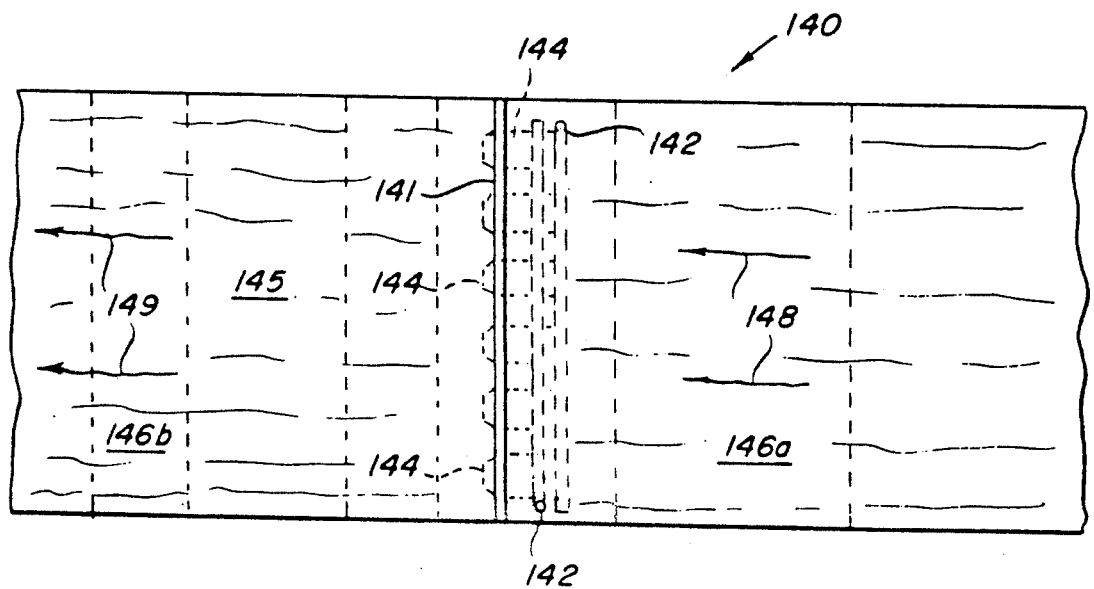
Figure 32:
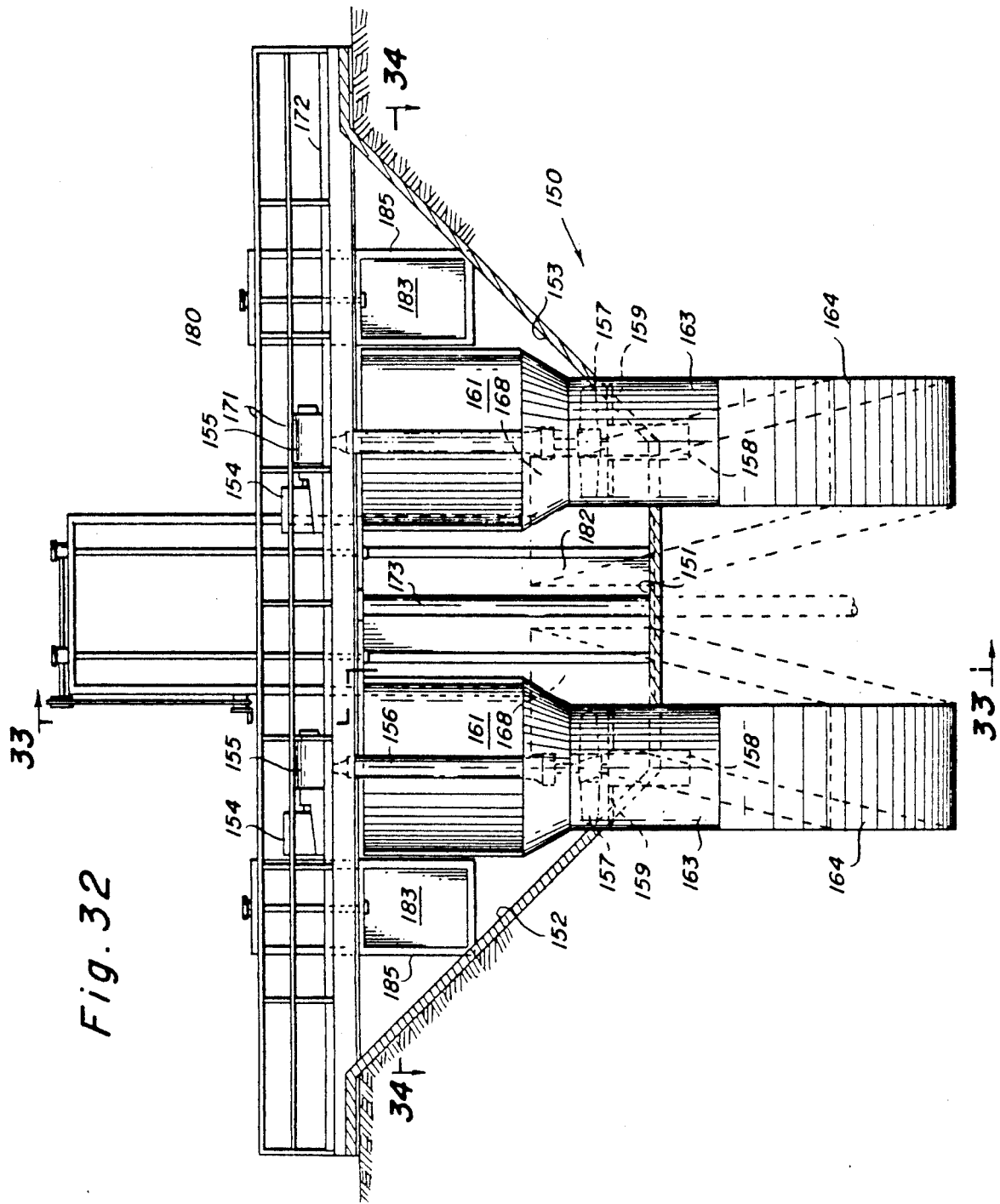
Figure 33:
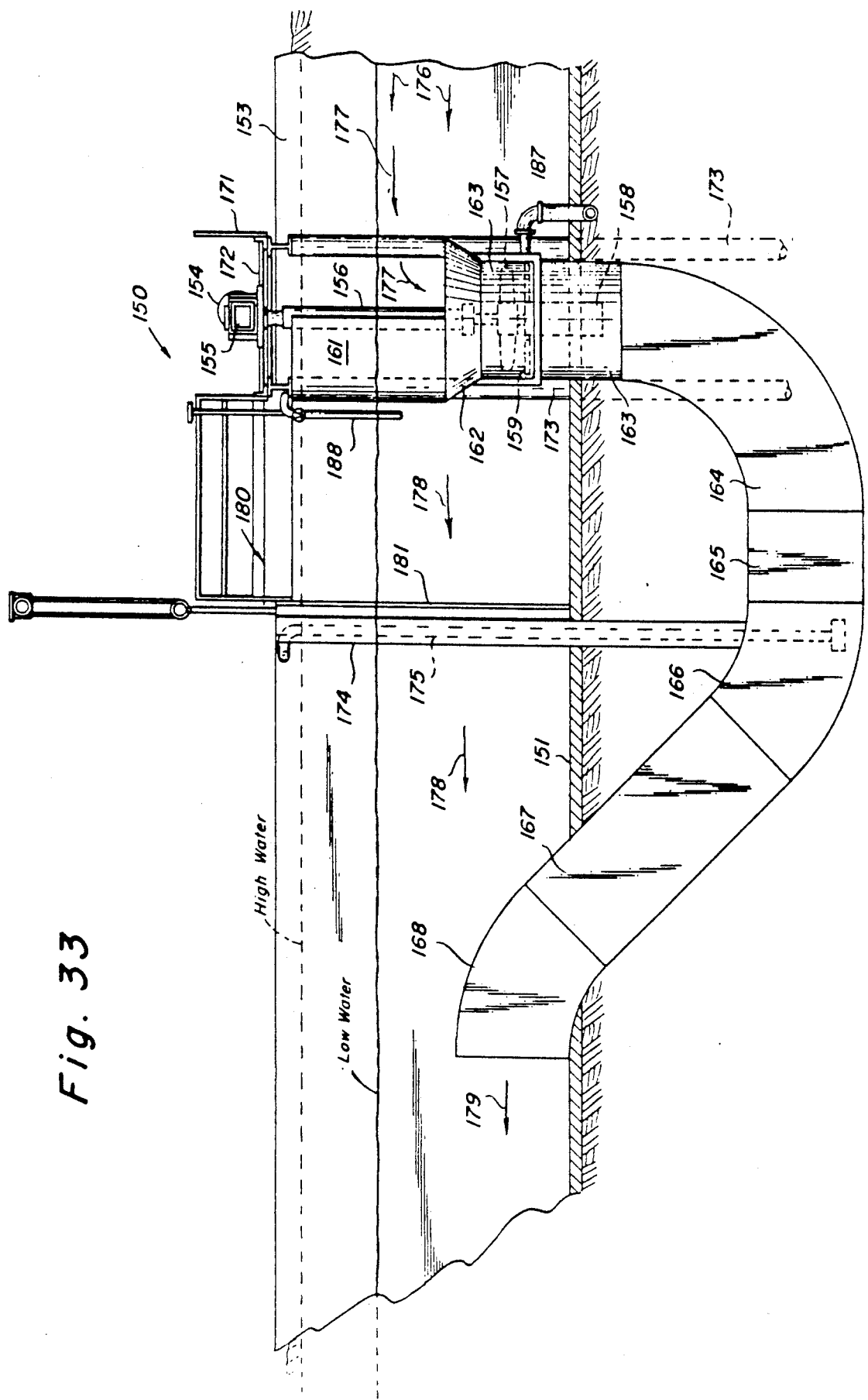
Figure 35:
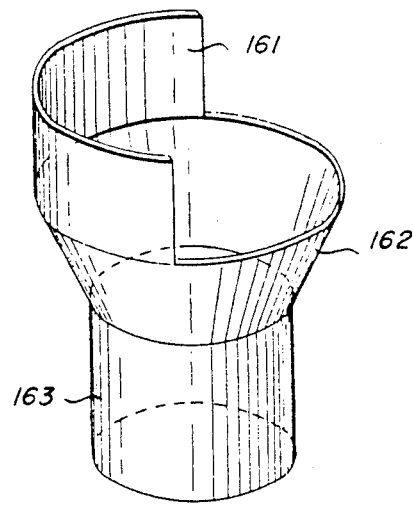
Figure 34:
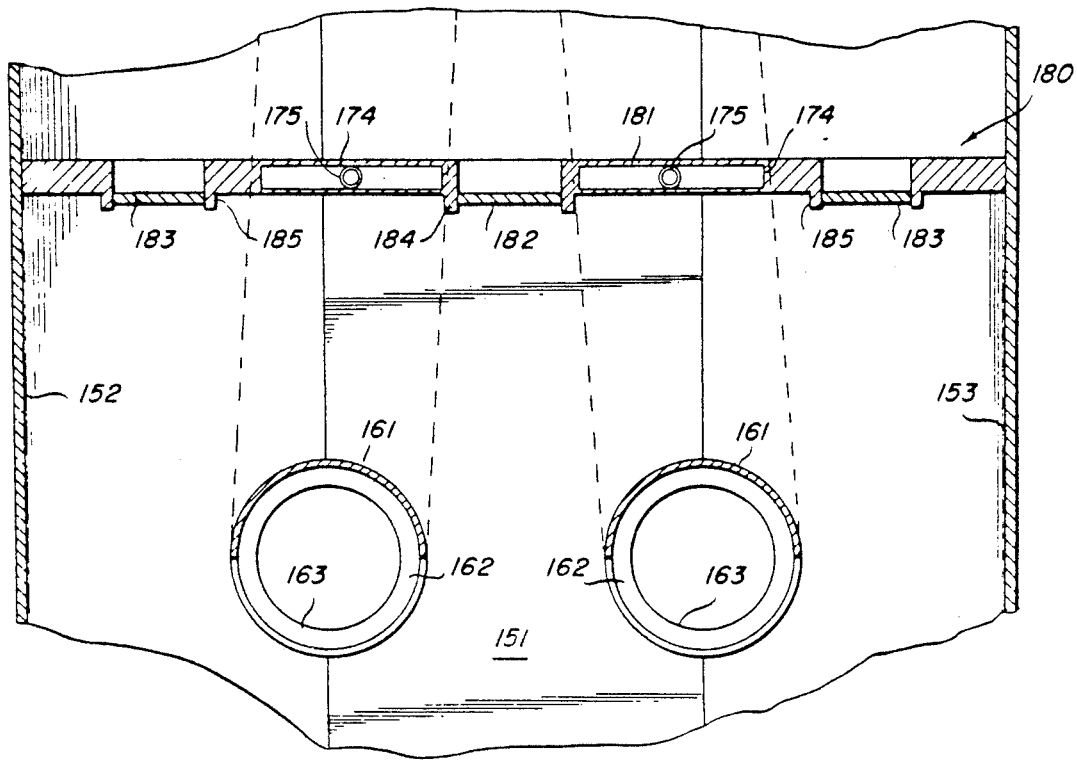

The barrier oxidation ditch apparatus 140, seen in sectional elevation in FIG. 30 and in plan view in FIG. 31, comprises a vertically disposed barrier 141, air and liquid delivery lines 142, a jet header connecting, a plurality of jets 144, an inclined baffle 145, and a trough in the bottom of the channel having sides 146a, 146b and a bottom 147. Barrier 141 preferably extends from above the surface of the mixed liquor to a depth that enables only as much intake flow 148 of liquor therethrough as to create homogeneous aeration in discharge flow 149, with jets 144 being also spaced closely enough for that result.

Inclined baffle 145 is positioned so that its lower edge is downstream of and slightly higher than the lower edge of barrier 141, whereby a very slight eddying flow 149a occurs over the upper edge of inclined baffle 145 and down into the gap between barrier 141 and baffle 145. Because the jet plumes (see FIG. 8) are directed against the downstream depression side 146b, the air bubbles do not rise until discharge flow 149 has moved well past the depression. Thus eddying flow 149a serves to prevent solids from settling onto baffle 145.

As one of the preferred embodiments of this invention, the mixing-control apparatus 150, as shown in FIGS. 32–35, is typically installed in the channel of an oxidation ditch having an island around which mixed liquor moves continuously in circuit flow. The channel has a floor 151, a sloping inner side 152 bordering the island, and a sloping outer side 153.

The apparatus 150 comprises an inner pump/aerator, an outer pump/aerator, and an adjustably apertured barrier assembly 180. Each pump/aerator comprises a motor 154 and a speed reducer 155 which are attached to a shaft 156, an impeller 157 which is attached to shaft 156, a slap ring 158 within which the lower end of shaft 156 rotates, an air sparge ring 159 which is disposed beneath impeller 157 and around slap ring 158, and an air supply line 187 which is connected to ring 159.

Each pump/aerator further comprises a concave baffle 161 for directing flow intake to the impeller, an intake funnel 162 to the upper edge of which baffle 161 is attached along approximately one-half its circumference, a draft tube 163 which is connected to the lower edge of funnel 162, and a discharge duct. Each pump/aerator is attached to and supported by an aerator support bridge, having handrails 171 and a floor 172, which is itself supported by columns 173 which are embedded in the earth.

Each discharge duct comprises a curved discharge section 164 which is connected to draft tube 163, a first straight section 165 which is connected to section 164 and is disposed at a depth of at least one duct diameter below channel floor 151, a curved updraft section 166 which is connected to section 165, a second straight section 167 which is connected to section 166, and a terminal section 168 which is connected to section 167 and is disposed immediately above floor 151. The updraft portions comprising sections 166, 167, 168 also converge, as indicated in phantom in FIG. 24, into close mutual proximity so that their discharge flows converge in the middle of the channel.

A rectangular access duct 174, preferably having the same cross-sectional length as the width of section 166, is vertically disposed above each section 166 and is connected thereto so that liquid stands therein at the same height as in the channel. An air diffuser assembly 175 is selectively lowered into each duct 174 to the bottom of section 166 and is connected to a source of compressed air for supplementary or alternative aeration of mixed liquor flowing through the discharge ducts.

The adjustably apertured barrier assembly 180 is disposed across the channel and is sealably attached to sides 152, 153 and to floor 151. Barrier assembly 180 divides the mixed liquor and the channel into upstream liquor within an intake channel and downstream liquor within a discharge channel. Concave baffle 161 and intake funnel 162 of each pump/aerator are within the intake channel, and each terminal section 168 is within the discharge channel. Thus the discharge ducts connect the upstream liquor to the downstream liquor, and the impellers 157 are pump means for pumping up to all of the upstream liquor through the discharge ducts while air sparge rings 159 and air diffuser assemblies 175, alone or in combination, are aeration means for aerating all of the intake liquor passing through the discharge ducts.

This barrier assembly 180 comprises a solid barrier 181, a main gateway or flow area which is selectively opened or closed to a desired extent by main slide gate 182, and a pair of side gateways or flow areas which are selectively opened or closed to a desired extent by side slide gates 183.

Main slide gate 182 is raised or lowered vertically within main guide tracks 184, and side slide gates 183 are raised or lowered vertically within side guide tracks 185. The device illustrated is manually operated and is commercially available.

A useful alternate construction for slide gates 182, 183 is a motor operated, channel-mounting sluice gate, which is also commercially available. It comprises a motor at the top of a metal frame and a plastic slide gate which is attached to a threaded lift rod which is disposed between the metal slide channels and connected to the motor by suitable gears.

Channel flow 176, having sufficient circuit-flow momentum to maintain its solids in suspension, divides (when gates 182, 183 are at least partially opened) into intake flows 177 which enter funnel 162 and induced flows 178 which move through the flow areas beneath gates 182, 183 without being aerated. Intake flows 177 become aerated flows 179 after emerging from terminal sections 168.

Any suitable aeration device can be installed, however, immediately downstream of gates 182, 183 in order to aerate flows 178 before they become blended with aerated flows 179 in order at least to approximate the benefits of the homogeneous aeration that is provided by a barrier oxidation ditch while simultaneously conserving much of the momentum in the circuit-flowing liquor 176. A particularly satisfactory aeration device for this purpose is the directional-mix jet aerator (eddy jet) which is believed to provide efficient aeration, at a depth corresponding to the floor of the channel, but relatively little propulsion.

The purpose of the adjustably apertured barrier apparatus 150 is to enable a compromise to be made by on-site experimenting between: 1) at one extreme, momentum conservation and 2) at the other extreme, prevention of back-mixing plus build-up of hydraulic head (more accurately expressed as downstream direction of propulsive energy). Maximizing the former goal requires full opening of slide gates 182, 183, but maximizing the latter requires closing them completely. Slide gates 182, 183 should therefore be opened only enough to utilize this momentum and not enough to allow upstream flow to pass therethrough.

Figure 36:
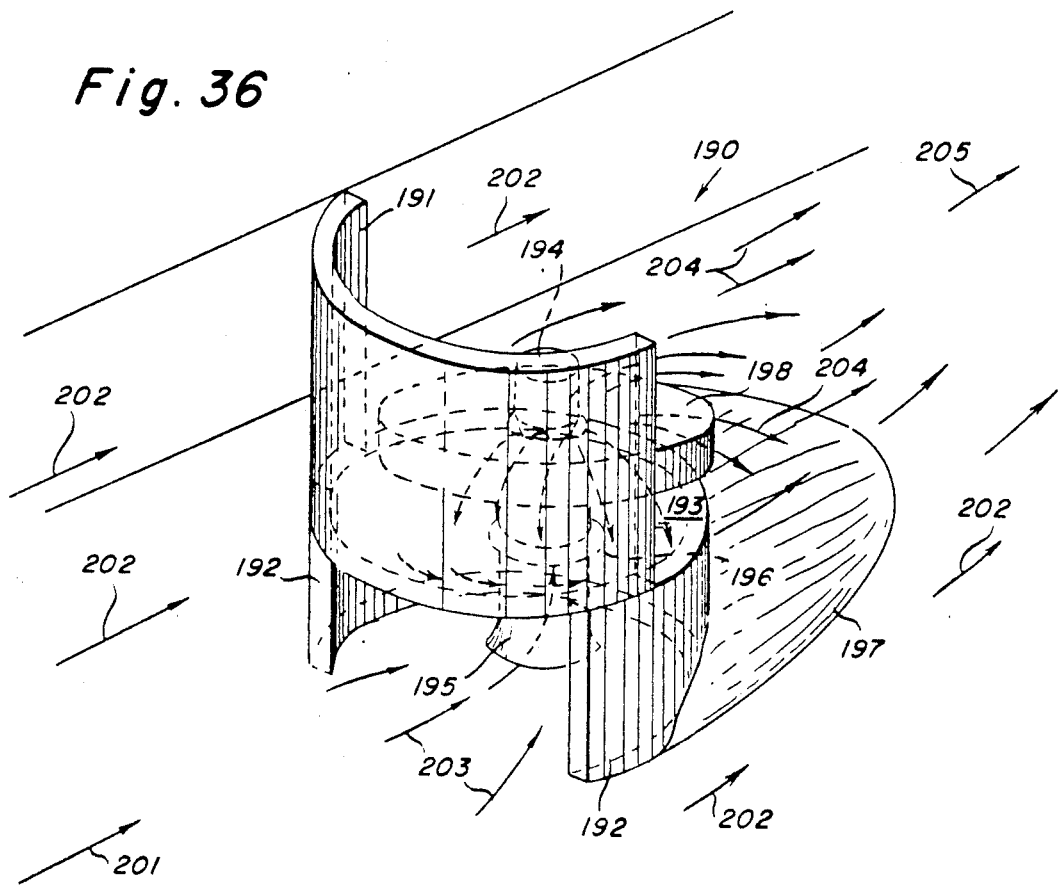
Figure 37:
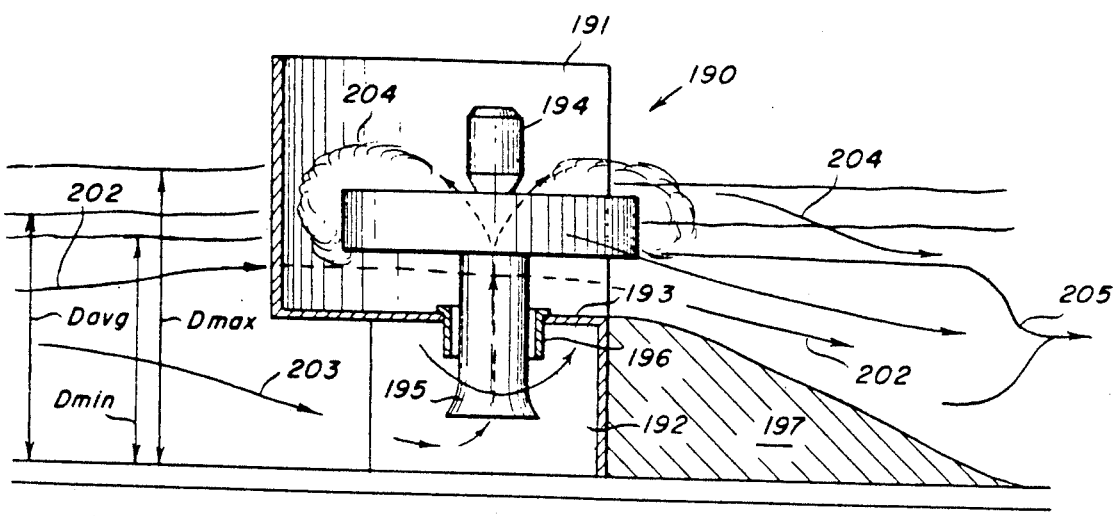
Figure 38:
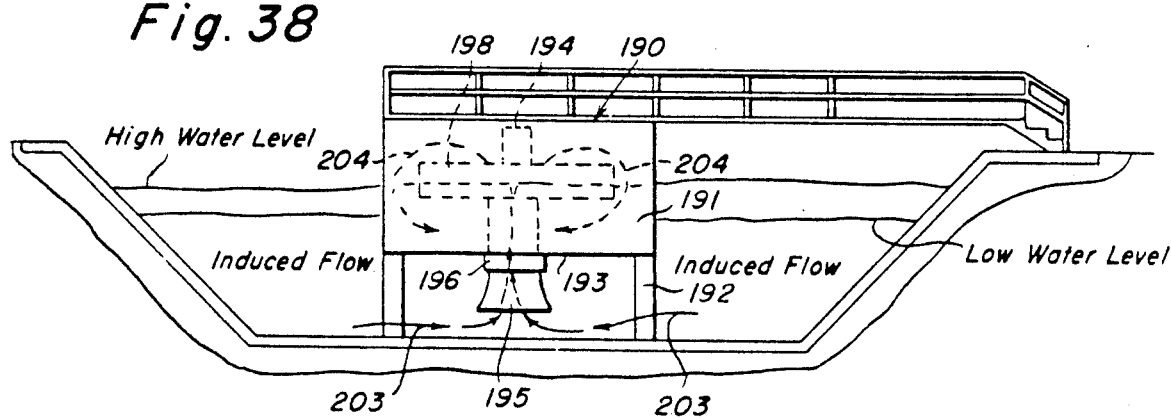

The dual-baffle pump/aerator assembly 190, seen in perspective in FIG. 36, in side view in FIG. 37, and in transverse section (across the channel, looking upstream) in FIG. 38 comprises a concave discharge baffle 191 facing downstream, a concave intake baffle 192 facing upstream, a horizontal barrier 193 between and attached to baffles 191, 192, a high-speed floating surface aerator 194, and a discharge slope 197 on the downstream side of baffle 192. Aerator 194 is supported by float 198 and is connected to draft tube 195 which is slideably attached to horizontal barrier 193 along sliding seal 196. Inflow 201 in the channel, which possesses circuit-flow momentum, splits into induced flow 202 and intake flow 203 which leaves aerator 194 as aerated circular discharge 204 so that total outflow 205 represents a blend of flows 202, 204.

Figure 39:
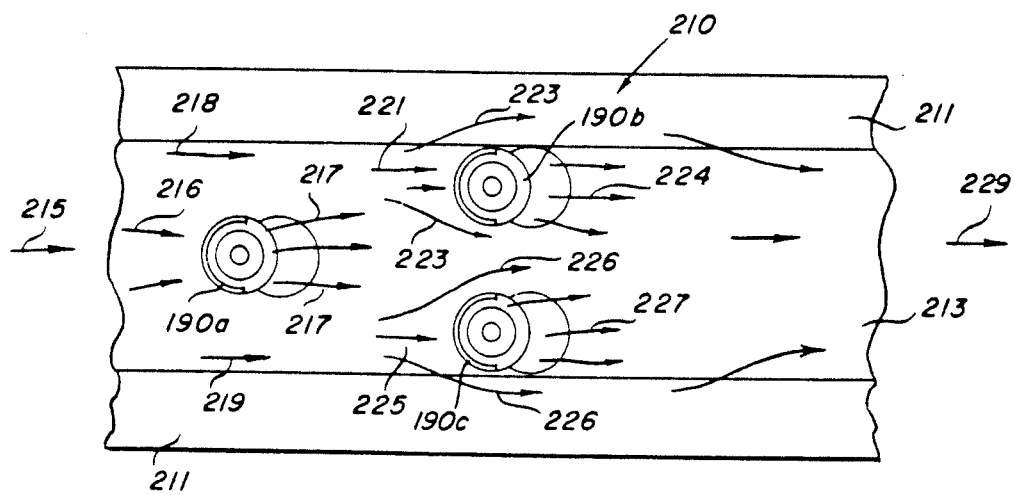

The aerator system 210 which is illustrated in FIG. 39 is disposed in the channel of an oxidation ditch. The channel has sides 211 and floor 213. The three aerators 190a, 190b, 190c are staggered over floor 213. Total inflow 215 divides into induced flow 218, intake flow 216 to aerator 190a, and induced flow 219. Induced flow 218 divides into intake flow 221 to aerator 190b, leaving as aerated discharge flow 224, and induced flow 223 which bypasses aerator 170b and some of which combines with discharge 217 from aerator 190a. Similarly, induced flow 219 partly bypasses aerator 190c as induced flow 226, some of which combines with discharge 217 and partly enters aerator 190c as inflow 225, becoming discharge flow 227. Thus, flows 217, 224, and 227 blend with flows 223 and 226 to become total outflow 229 which has been reasonably uniformly or homogeneously aerated.

Figure 40:
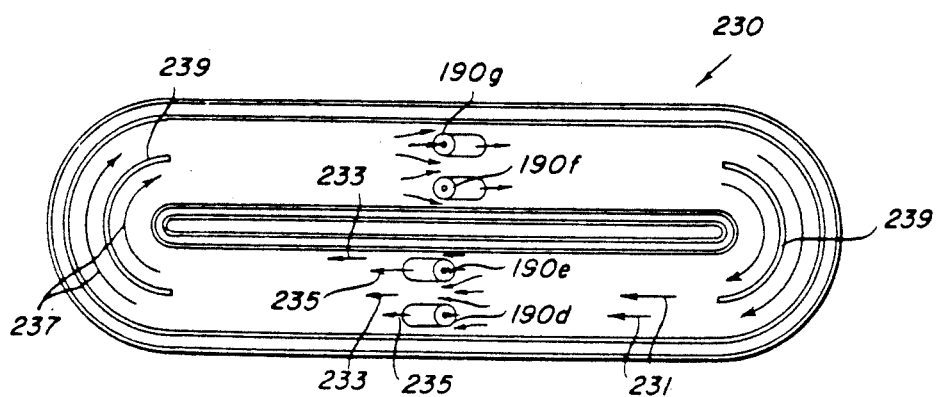

FIG. 40 specifically illustrates an oxidation ditch 230 having a channel that is wide enough to accommodate only two units 190d, 190e on one side and a similar pair of units 190f, 190g on the other side to provide balanced propulsion and very little back-mixing but heterogeneous aeration as total inflow 231 splits and becomes aerated flows 235 and induced flows 233 which then heterogeneously blend into total flows 237 as they pass around the bend and on either side of one of the turning basin baffles 239. Flows 237 can become reasonably depleted in D.O. content by the time that the second pair of units 190f, 190g is reached if the flow velocity and channel length are suitable.

Oxidation ditch 230 represents a compromise between cost and efficiency, but such an arrangement can have practical utility where animal wastes, for example, are to be biologically treated in an existing oxidation ditch to provide a nitrate-rich fertilizer slurry so that denitrification is not beneficial.

In general, however, it is always desirable to aerate the mixed liquor in an efficient manner by aerating all portions of the flow as uniformly as possible, i.e., to provide homogeneous aeration.

Figure 41:
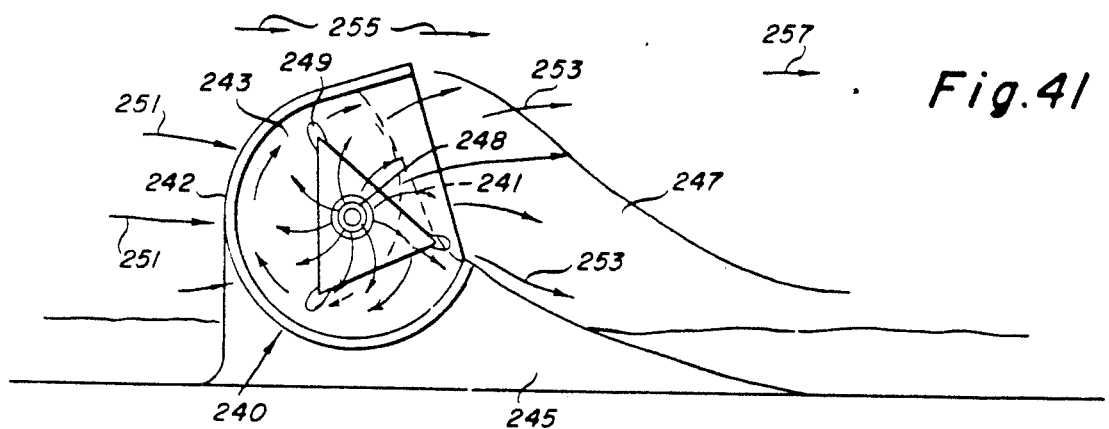

The side-attached dual-baffle aerator/pump assembly 240 which is shown in plan view in FIG. 41 comprises a lower intake baffle 241, an upper discharge baffle 242, a horizontal flow barrier 243 disposed therebetween and attached to both baffles, a filled-in side area 245, a discharge slope 247 downstream of baffle 241, and a floating low-speed surface aerator 248 which is supported by three floats 249.

Intake flow 251 to aerator 240 is discharged with considerable tangential velocity as aerated discharge flow 253. Moving rapidly beyond discharge slope 247, it tends to fan out toward the middle of the channel, inducing the flow of a significant amount of additional liquor 255 which blends with flow 253 to produce heterogeneously blended flow 257.

Figure 42:
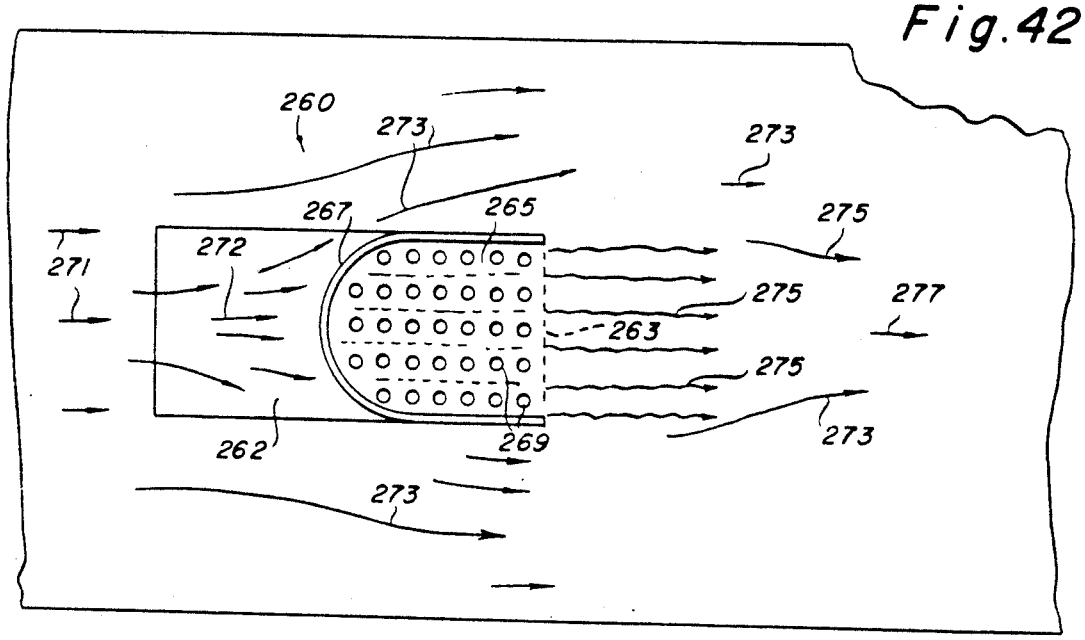
Figure 43:
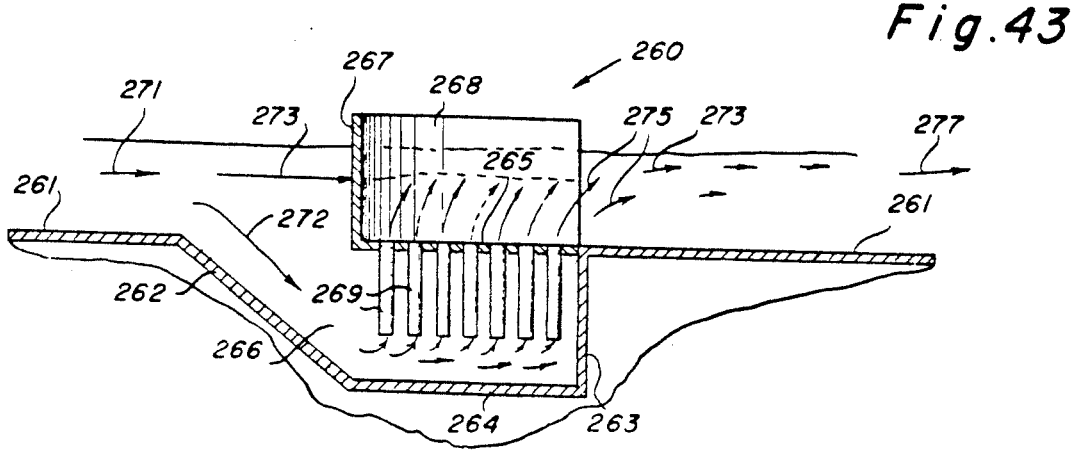

The static-mixer flow-directing unit 260 that is shown in FIGS. 42 and 43 comprises an upper concave baffle 267 which faces downstream, a horizontal barrier 265 which is attached to baffle 267 and intake body end 263 and is aligned with floor 261 of the channel, and an array of static aerators 269 which are sealably attached to barrier 265 and are the sole connecting means between intake body 266 and discharge body 268 thereabove. Intake body 266 of mixed liquor is defined by the bottom 264, sides, and downstream end 263 of the undercut intake recess beneath horizontal barrier 265. This recess functions as a concave intake baffle.

Thus the total flow 271 in the channel comprises induced flows 273 which bypass unit 260 and intake flow 272 which moves down ramp 262 into intake body 266, upwardly through static mixers 269, and downstream as discharge flow 275 from discharge body 268. Discharge flow 275 and induced flows 273 blend to form heterogeneously blended flow 277.

This unit 260 is particularly well suited for installation immediately downstream of main slide gate 182 of flow-control apparatus 150. Gate 182 can be selectively lifted to a height that admits the desired inflow 272 to intake body 266 in accordance with the pressure upon barrier 181 which can be measured in inches of water by a simple manometer. Discharge flow 275 then is caught and accelerated by converging discharge flows from terminal sections 168.

Thus the flow efficiency of the directional-discharge barrier oxidation ditch is enhanced. Further, sensitivity and accuracy of control of aeration and flow velocity for adjusting aerobic/anoxic volume fractions is increased for use by the operator during unusual periods of inflow volume and/or food content and/or temperature. Still further, the combination of unit 260 with flow-control apparatus 150 enables all induced-flow liquor moving through the main gateway to be aerated and thereby substantially avoids unequal aeration of any portion of the mixed liquor, thus maintaining the aeration efficiency of homogeneous aeration that is characteristic of a barrier oxidation ditch.

Figure 44:
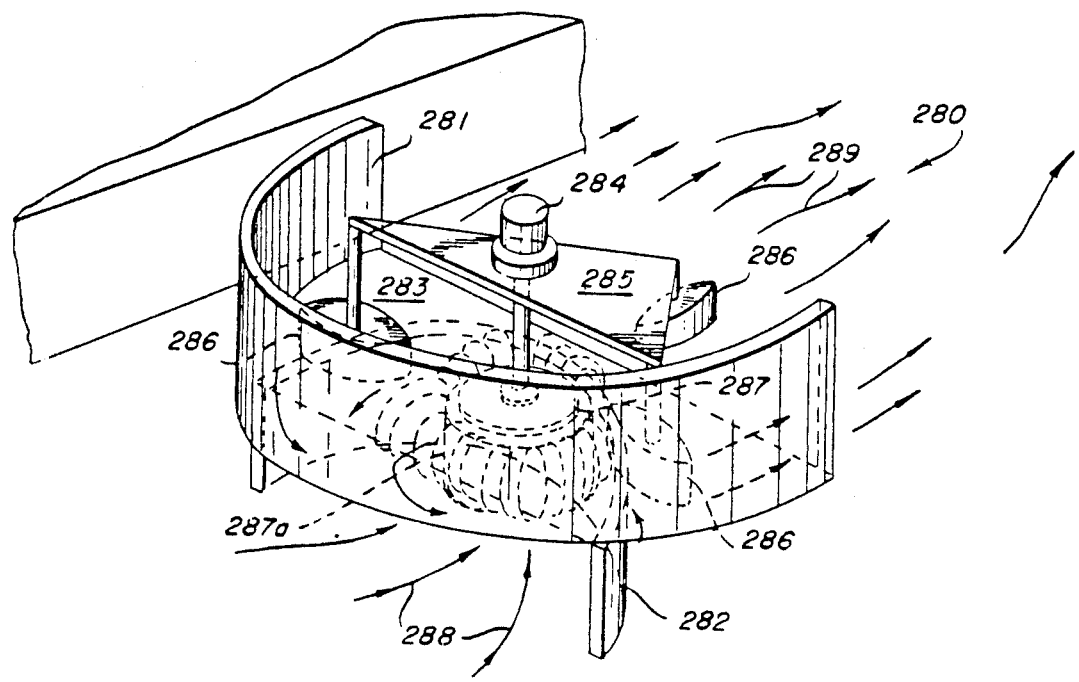

Another circular flow-directing aeration unit, shown in perspective in FIG. 44, is a dual-baffle pump/aerator assembly 280 comprising a floating low-speed surface aerator, a pair of oppositely facing concave baffles 281, 282, and a circular horizontal barrier 283 to which baffles 281, 282 are attached. The surface aerator comprises a motor 284 which is attached to a vertically disposed shaft and drives an impeller 287 which is disposed within a draft tube 287a and above an opening in horizontal barrier 283. Motor 284 is supported by a triangular platform 285 resting at its corners on three floats 286. Intake flow 288 moves upwardly through the short draft tube and is flung radially by impeller 287, being directed downstream as discharge flow 289 by concave discharge baffle 282.

Figure 49:
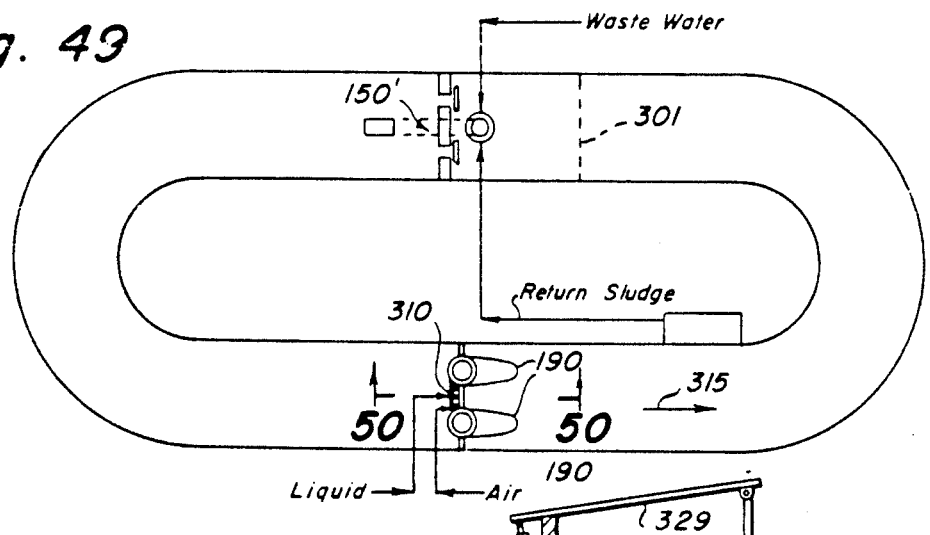
Figure 50:
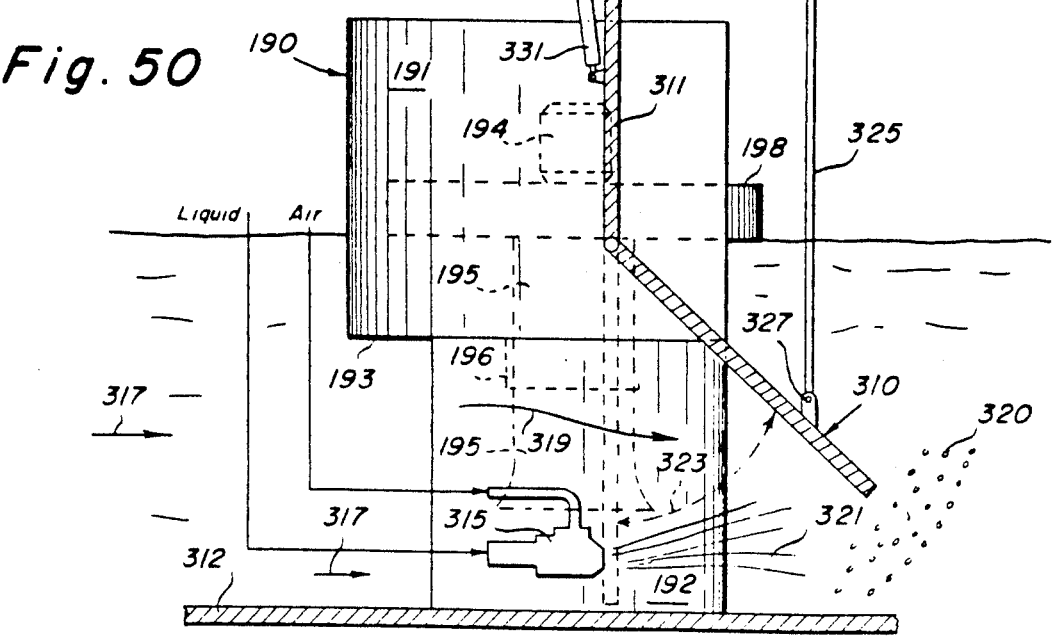

The surface-type and subsurface type pump/aerators described hereinbefore and illustrated in FIGS. 36-38 and 41-44 can be utilized in an oxidation ditch in various ways. Preferably, these pump/aerators are utilized in a barrier oxidation ditch or in an adjustably barriered oxidation ditch, whereby essentially limitless propulsion can be available. However, at one extreme, they can provide both improved aeration and improved propulsion in an oxidation ditch having no barriers, or, at the other extreme, they can be an integral portion of a barrier system, as illustrated in FIGS. 49 and 50. They can be combined with each other, as illustrated in FIGS. 39 and 40, with an adjustably apertured barrier apparatus 150, or with an eddy jet apparatus, as is also shown in FIGS. 49 and 50.

Further, these dual-baffle pump/aerators are capable of additional versatility because their intake and discharge baffles can be oriented at other angles than the 180° orientation that is shown in the drawings. For example, they can he oriented at 135° or 90°, and the horizontal barrier and/or one or both wings of either or both concave baffles can be extended or bent to any desired shape (such as paraboloid) for controlling the movements of the intake and/or discharge flows and particularly for preventing back-mixing of freshly aerated discharge flows into the intakes of their pumps.

The reasons therefor are as follows: (1) these flow-directing units are subject to far less back-mixing than prior art pump/aerators because of their intake and discharge baffles and horizontal barrier; (2) they provide some directional-flow propulsion because of the respective upstream and downstream alignments of their concave intake and discharge baffles; (3) they can be installed anywhere in the channel of the ditch (not merely in a certain position at one end of a dividing wall); (4) they can be connected in side-by-side relationship to form a barrier across a straight portion of the endless channel of an oxidation ditch so that their intake and discharge flows are aligned with the channel; (5) they can be connected in side-by-side relationship to form a barrier across a bend of such a channel so that their intake and discharge flows diverge at, for example, 90°; (6) they can be grouped in close proximity (as indicated in FIGS. 39 and 40) to generate and maintain as much volume of flow within the channel as desired, and (7) they can be positioned (also as shown in FIG. 39) in a staggered array so that even though induced-flow momentum is conserved, direct aeration is maximized and heterogeneous aeration is minimized.

Figure 45:
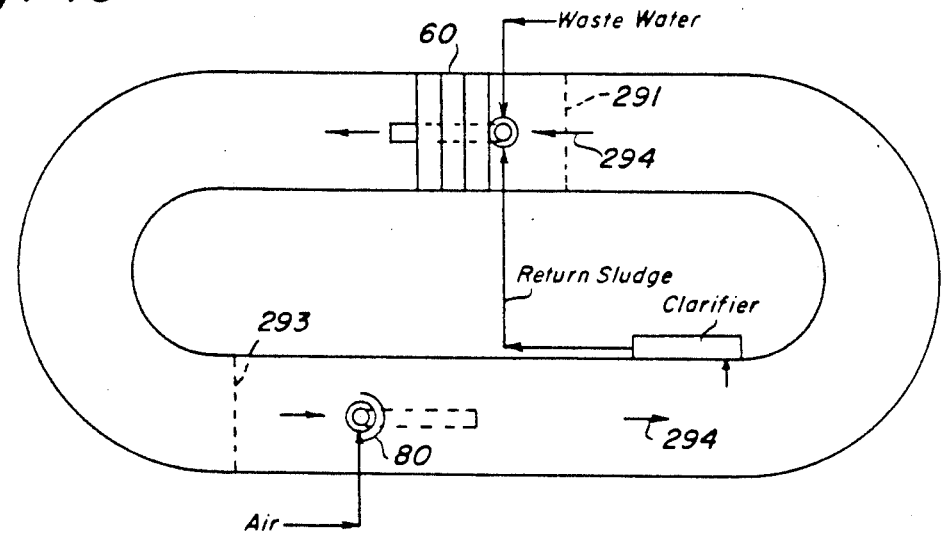

In FIG. 45, a barrier oxidation ditch contains a barriered pump/circulator 60 (as seen in FIG. 18) and the pump/aerator 80 of FIG. 20, equipped with the extended intake baffle 86 shown in FIG. 21, with intake and discharge thereof spaced far enough apart to form a water barrier that prevents back-mixing. Pump/aerator 80 thus furnishes all of the aeration for the ditch (herein defined as point-source heterogeneous aeration) and some of the propulsion for controlling end 291 of its aerobic zone and end 293 of its anoxic zone, but the aeration is less efficient than if pump/aerator 80 used a complete barrier, whereby aeration would be homogeneous through the barrier. However, one of the dual-baffle pump/aerators 190, 240, 260, 280 can be installed on each side of pump/aerator 80 so that homogeneous aeration is at least approximated and maximized. As shown in FIG. 45, pump/circulator 60 of this ditch is a point-source mixer for the wastewater and return sludge while the pump/aerator 80 furnishes additional propulsion and point-source heterogeneous aeration and facilitates conservation of momentum in flow 294.

Figure 46:
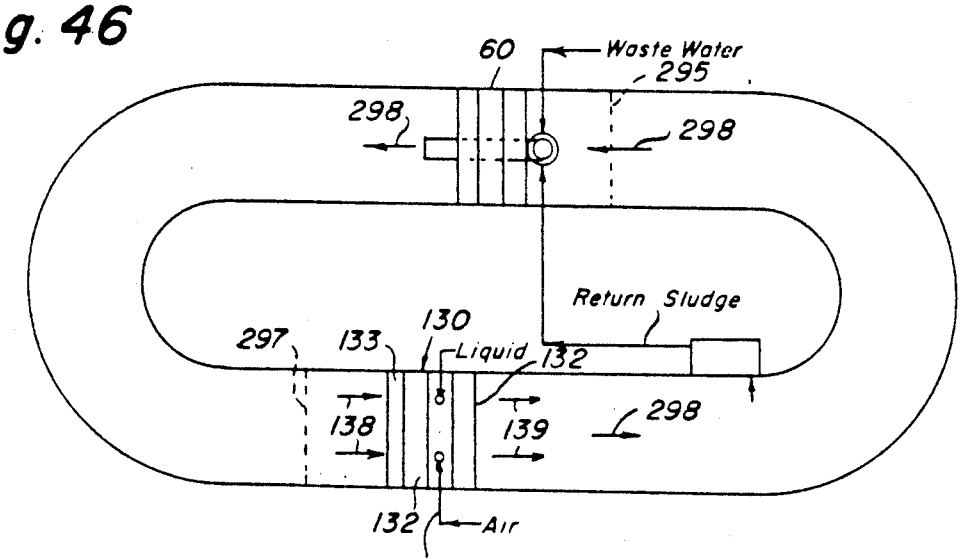

In FIG. 46, a similar barrier oxidation ditch is provided with the barriered pump/circulator 60, to provide point-source homogeneous mixing for the wastewater and return sludge, and with the eddy-jet barriered pump/aerator 130 that is shown in FIGS. 28 and 29, to provide point-source homogeneous aeration. Varying the speed of impellers 61 and the air supply rate to air delivery line 134 of apparatus 130 enables D.O. content and velocity of flow 298 to be independently controlled so that end 295 of its aerobic zone and end 297 of its anoxic zone can be selectively controlled.

Figure 47:
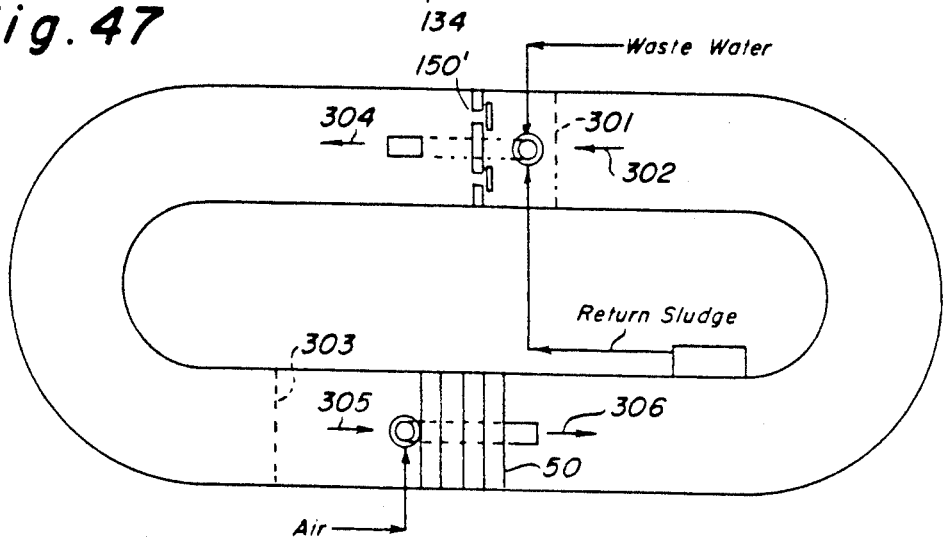

In FIG. 47, a barrier oxidation ditch is provided with a barriered pump/aerator 50, to provide point-source homogeneous aeration and to control the propulsion. It is also provided with an adjustably apertured barrier 150' (as seen in FIGS. 32-35 but with no aeration means in the draft tube), in order to selectively provide point-source heterogeneous or homogeneous mixing for the wastewater inflow and the return sludge. This arrangement is highly preferred because there is no energy penalty if the gateways of apparatus 150' are opened. Further, the locations of end 301 of the aerobic zone and of end 303 of the anoxic zone can be controlled principally with barriered pump/aerator 50 which provides homogeneous aeration while apparatus 150' is providing selectively homogeneous or heterogeneous mixing for maximizing denitrification efficiency, using nitrate oxygen and H$_2$S.

An important reason for this arrangement is that in a barrier oxidation ditch the homogeneity of aeration creates an essentially vertical and transversely disposed D.O. profile. Thus end 301 of the aerobic zone is essentially a planar end as compared to the diffused and irregular terminus that exists in the prior art. Such a situation makes it worthwhile to locate apparatus 150' as close to the beginning of the anoxic zone as possible, for every foot of linear distance along the channel represents an important volume increment that can be made available for denitrification activity in the anoxic zone. Therefore, point-source homogeneous mixing of raw wastewater and return sludge with oxygen-depleted mixed liquor at the beginning of the anoxic zone enables denitrification to be initiated relatively instantaneously, as compared to prior art practices, and conserves valuable space in the oxidation ditch. Such point-source homogeneous mixing is effective in this manner because it exposes all of the raw wastewater to all of the mixed liquor containing NO$_3$— oxygen and facultative bacteria.

Flow 302 is nearly depleted of dissolved oxygen, its mixed liquor being below 0.5 mg/l D.O. by the time homogeneous mixing of hungry microorganisms occurs with return sludge and with the abundant food in the inflowing wastewater, so that the nitrate (NO$_3$) oxygen is rapidly consumed while BOD(5) and H$_2$S are reduced in flow 304. By the time that end 303 is reached, flow 305 is deficient in both D.O. and NO$_3$— and NO$_2$— anions and is ready for "luxury" uptake of oxygen within Is barriered pump/aerator 50 which quickly provides the desired homogeneous aeration in flow 306.

Figure 48:
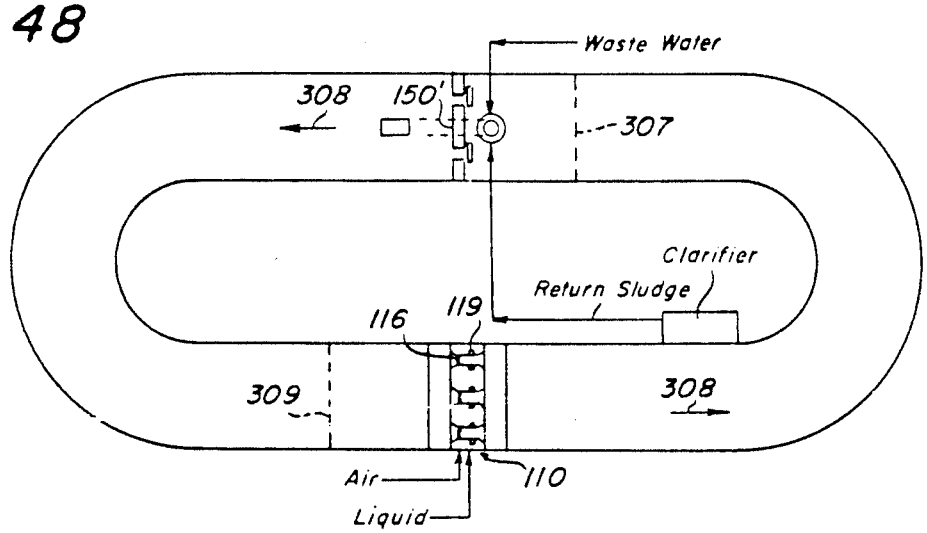

The oxidation ditch of FIG. 48 comprises an adjustably apertured barrier device 150' for mixing and a barriered eddy-jet apparatus 110 for point-source homogeneous aeration. This arrangement is also preferred because it enables end 307 of its aerobic zone and end 309 of its anoxic zone to be readily controlled while offering efficient aeration and flexibility for conservation of momentum in flow 308.

The oxidation ditch in FIG. 49 comprises an adjustably apertured draft tube circulator 150' on one side for either heterogeneously or homogeneously mixing wastewater inflow and return sludge with mixed liquor while providing propulsion and selectively conserving momentum. On the other side, the ditch has a pair of dual-baffle pump/aerators 190 and a jet pump/aerator 310. The pump/aerators 190 are connected to each other and to the sides and bottom of the channel by a barrier 311 which is hingeably apertured at its bottom between the pump/aerators 190 by a flap 313.

Figure 5:
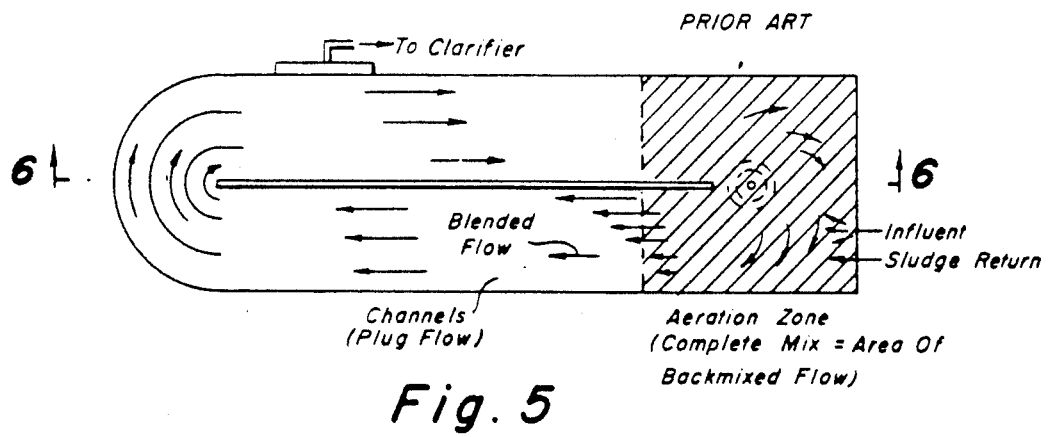
FIG. 5 is a plan view of an oxidation ditch of the Carrousel type in which a dividing wall forms two channels and a single low-speed surface aerator, mounted vertically and close to the dividing wall, provides aeration, mixing, and propulsion of a sufficient flow in the channel for operation of the ditch (hatched areas indicate a complete-mix zone or back-mixed zone).
Figure 6:
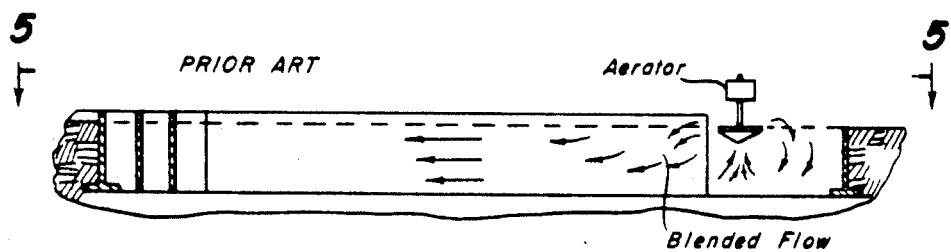
FIG. 6 is a sectional side view of the ditch and aerator seen in FIG. 5.
Figure 7:
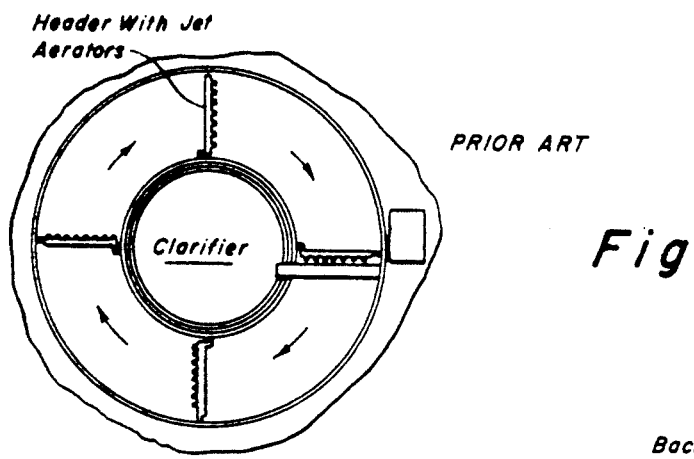
FIG. 7 is a plan view of a circular oxidation ditch in which an annular channel surrounds a circular clarifier. Four headers for directional-mix jet aerators are radially disposed in the channel and spaced at 90° intervals.
Figure 8:
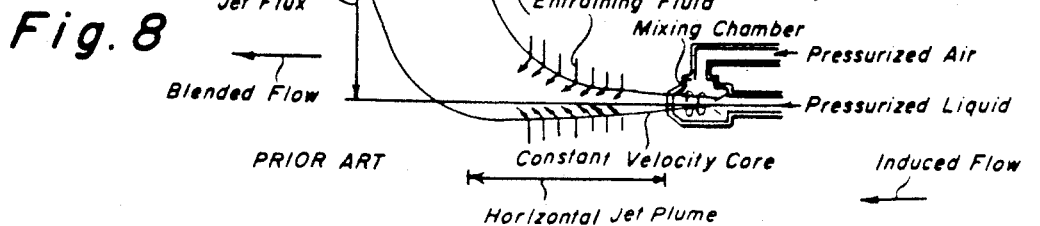
FIG. 8 is a sectional elevation through a single directional-mix jet aerator (eddy jet) to reveal its mixing pattern, back-mixing tendancies, and induced-flow characteristics.
Figure 9:
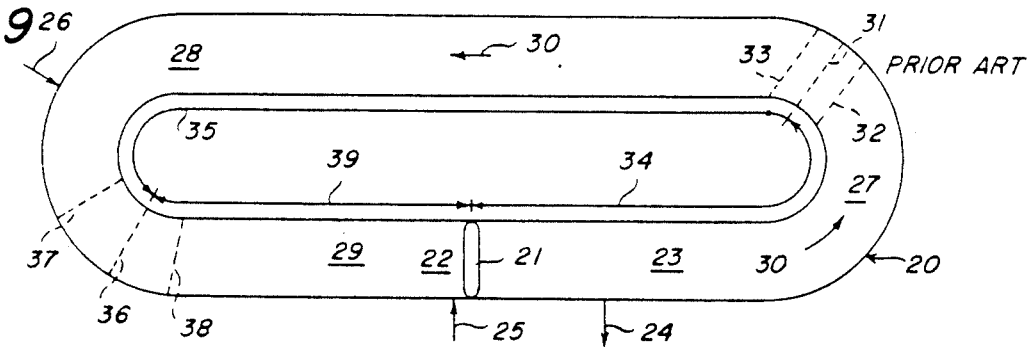
FIG. 9 is a plan view of a typical prior art oxidation ditch of sufficiently small size to possess point-source aeration and propulsion.
Figure 10:
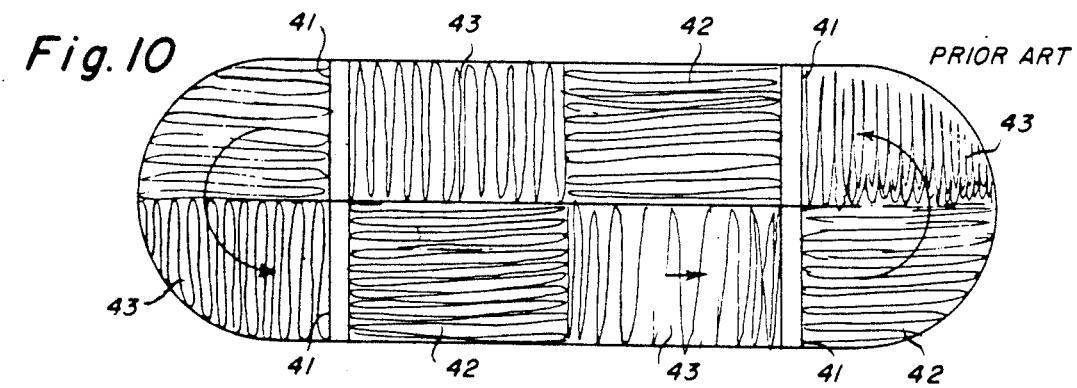
FIGS. 10-12 are plan views of typical prior art oxidation ditches of comparable size and shape which comprise three types of aerators furnishing multi-source aeration and propulsion.
Figure 11:
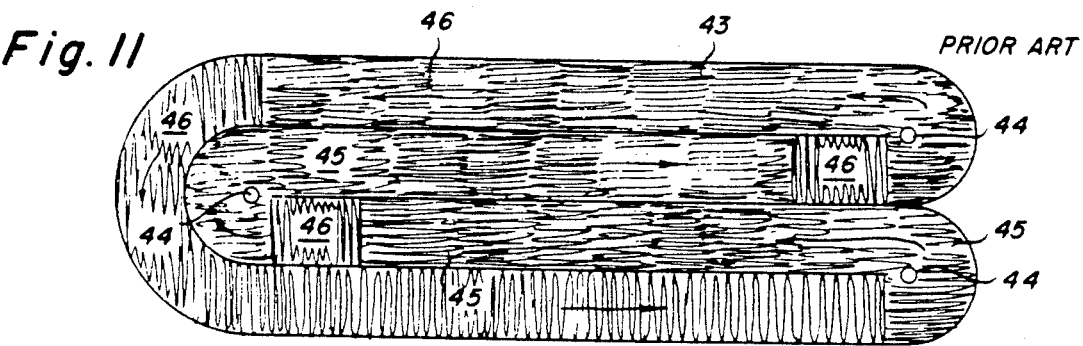
Figure 12:
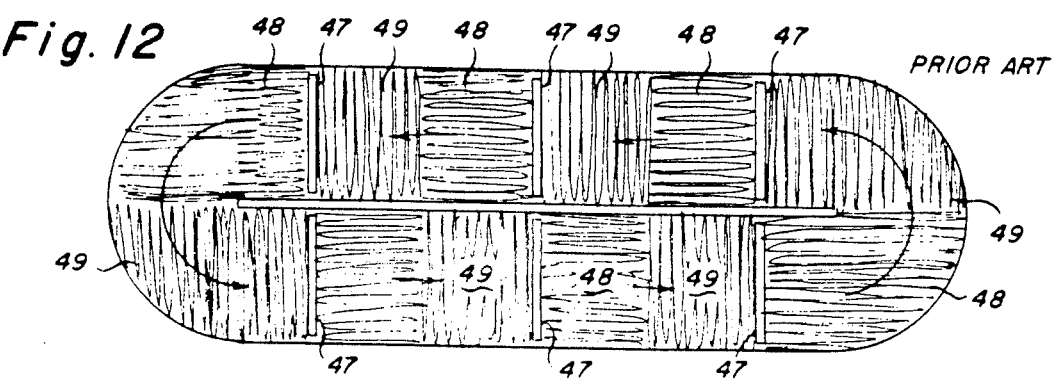
Figure 10A:
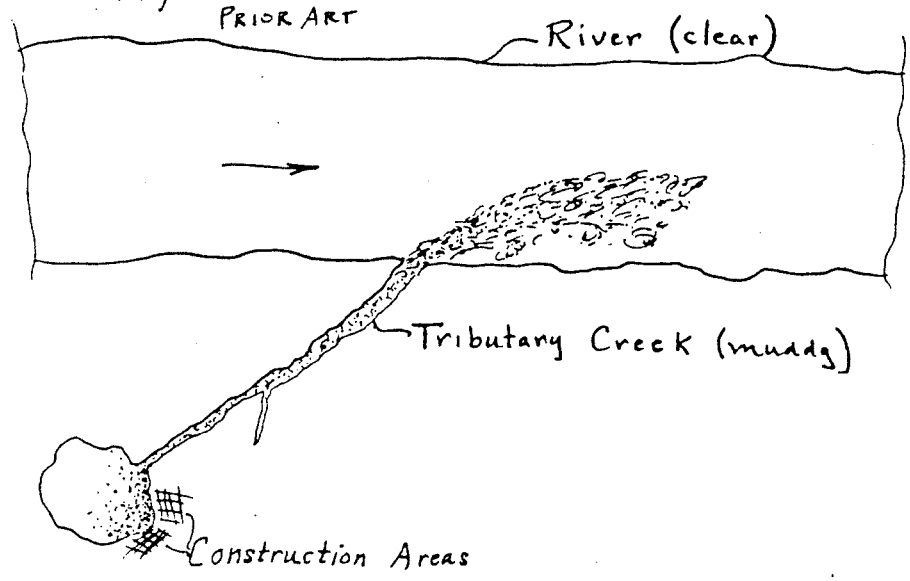
FIG. 10A is a plan view of a typical river in clear condition and one of its tributaries in muddy condition for illustrating the lines of demarcation between clear and muddy waters as the current carries downstream from the mouth of the tributary creek.
Figure 11A:
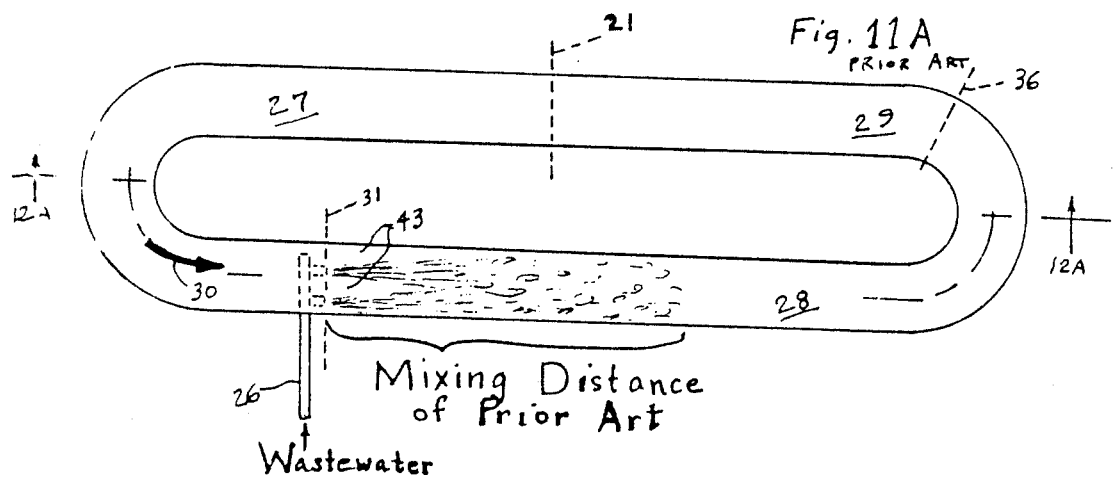
FIG. 11A is a plan view of the oxidation ditch of FIG. 9 which has a typical header and outlets within the channel for introducing a stream of influent wastewater that requires a characteristic mixing distance.
Figure 12A:
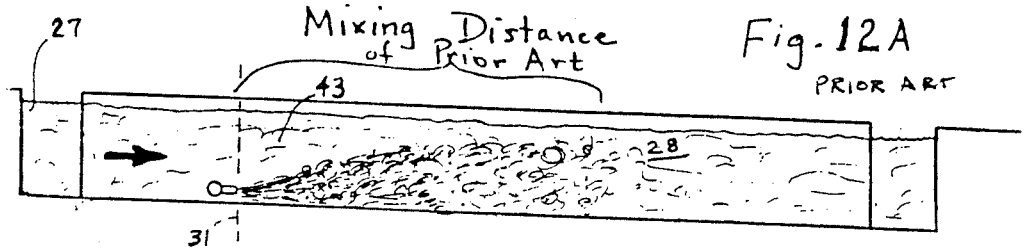
FIG. 12A is a sectional elevation of the oxidation ditch of FIG. 11A, taken in the direction of the arrows 12A—12A in FIG. 11A.
Figure 13A:
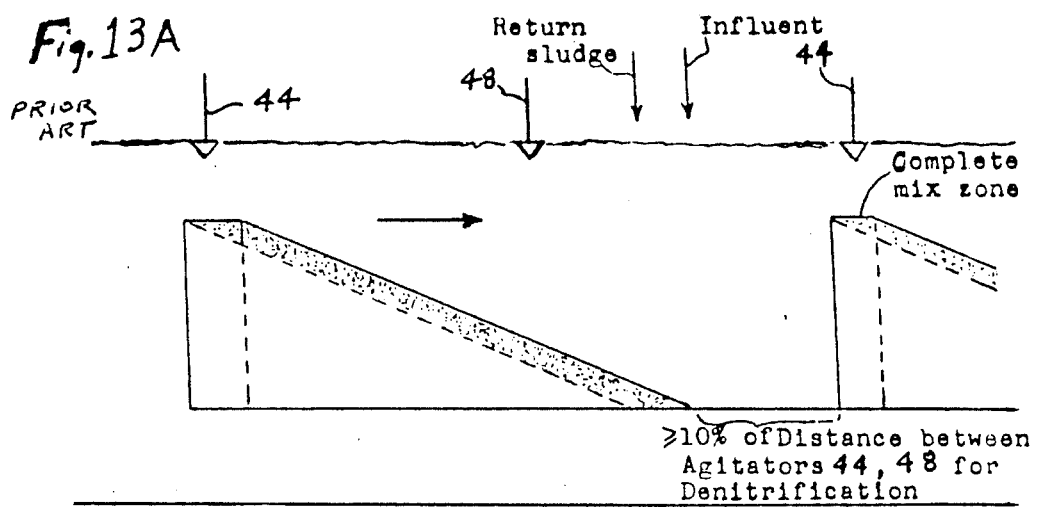
FIG. 13A is a sectional elevational sketch of a prior art oxidation ditch having mechanical surface aerators as disclosed in U.S. Pat. No. 3,900,394.
Figure 14A:
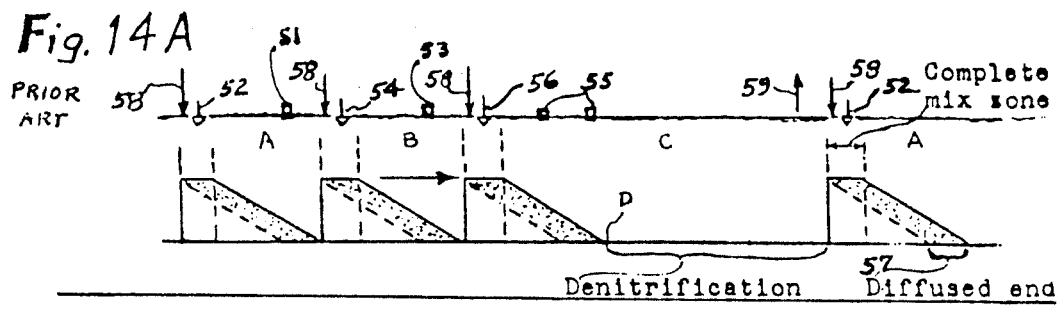
FIG. 14A is a sectional elevational sketch of a prior art oxidation ditch having a plurality of mechanical surface aerators as disclosed in U.S. Pat. No. 4,159,243.
Figure 13:
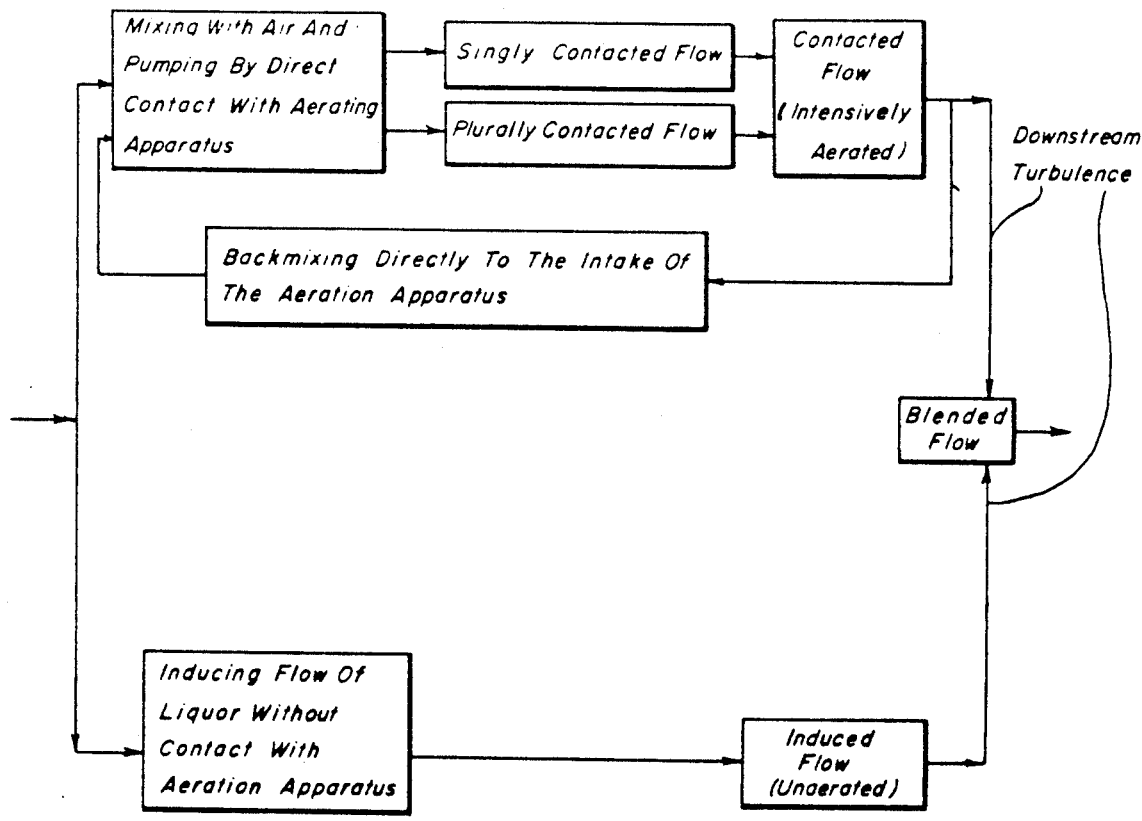
FIG. 13 is a schematic flow sheet that illustrates heterogenous aeration and back-mixing by prior art aerators in oxidation ditches.
Figure 14:
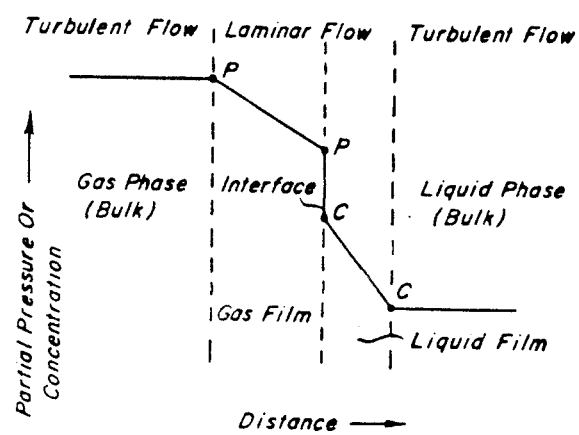
FIG. 14 is a schematic cross-section illustrating the two-film gas transfer theory for transfer of gas molecules from the gas phase (e.g., an air bubble in mixed liquor) to the liquid phase.
Figure 15:
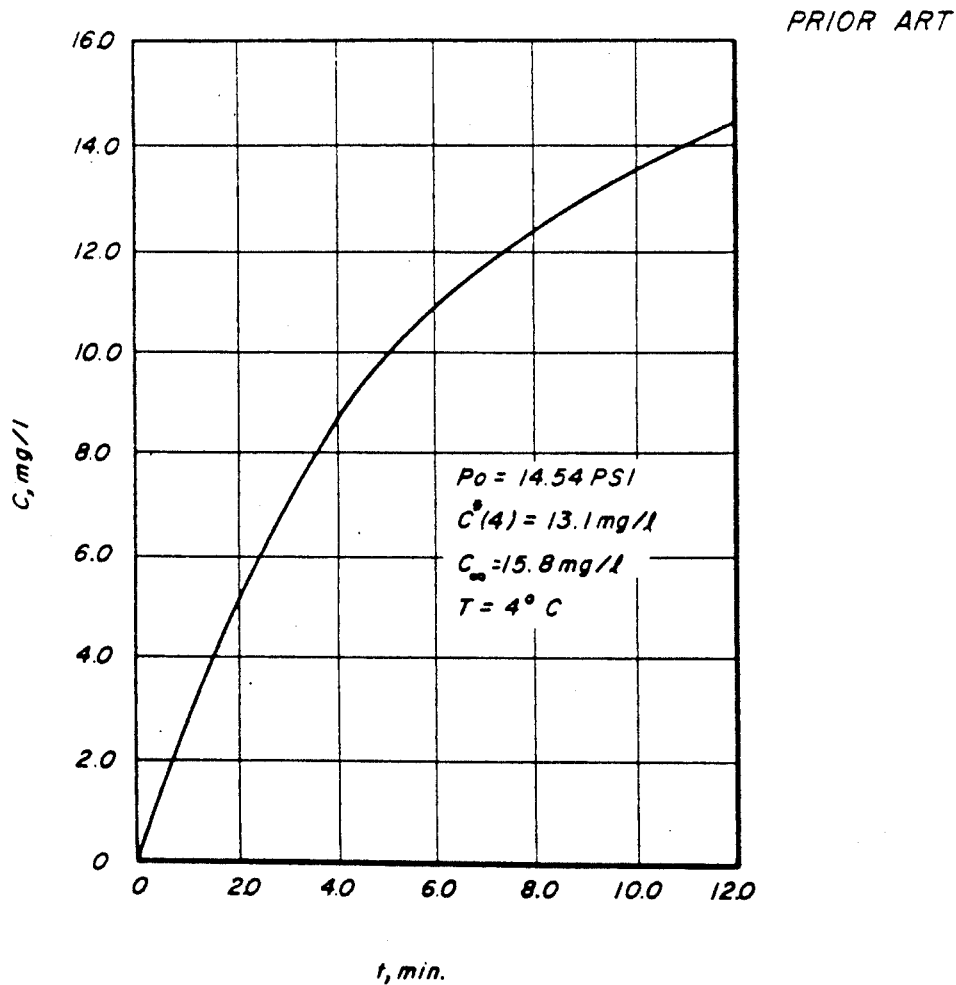
FIG. 15 is a graph showing the content of dissolved oxygen, in a large tank of water that is being agitated by a submerged impeller at constant power and with a compressed-air sparge therebeneath, versus cumulative mixing time.
Figure 16:
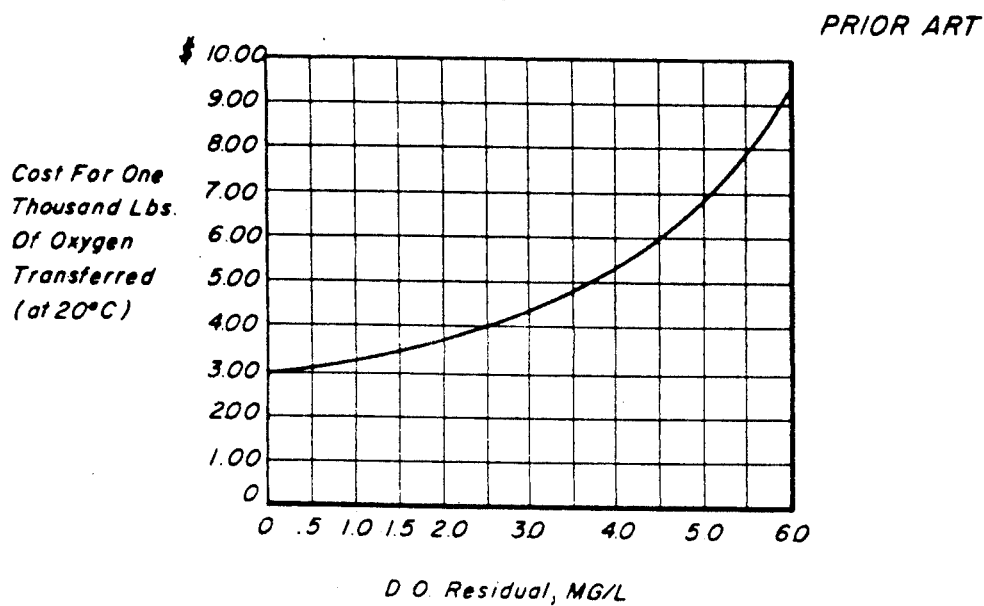
FIG. 16 is a graph illustrating the relative cost in dollars (at an unknown date) for forcing, with a floating surface aerator as seen in FIG. 3, a unit quantity of oxygen (1,000 pounds) into water containing various residual amounts of dissolved oxygen.

Immediately upstream of flap 313 is a directional mix jet aeration header, as seen in FIGS. 7 and 8, which supplies compressed air and high-pressure liquid for a row of jet aerators 315 which are closely spaced and aligned with the direction of incoming flow 317. They spew a row of constant-velocity cores 321 beneath opened flap 313, and this flap directs induced flow 319 downwardly to depress the row of cores 321 and cause mixing therewith before the air bubbles 320 have begun to rise, so that back-mixing is prevented and heterogeneous aeration efficiency is improved.

Flap 313 is moved along arc 323 by a pair or rods 325 which are pivotally connected at their ends to lugs 327 on flap 313 and to a pair of levers 329 which are pivoted along the top edge of barrier 311 and connected to the piston rods of a pair of hydraulic pistons 331. When the piston rods are fully extended, flap 313 is closed, against the force of the current, to form a full barrier adjacent to bottom 312 of the channel and between pump/aerators 190. Flap 313 is preferably hinged at the high-water level so that the total depth of mixed liquor can flow therebeneath.

In combination, when pump/aerators 190, 310 are in operation, this oxidation ditch tends to conserve momentum in flow 317 when flap 313 is wide open and provides the advantages of both surface aeration and high-pressure jet subsurface aeration.

Figure 51:
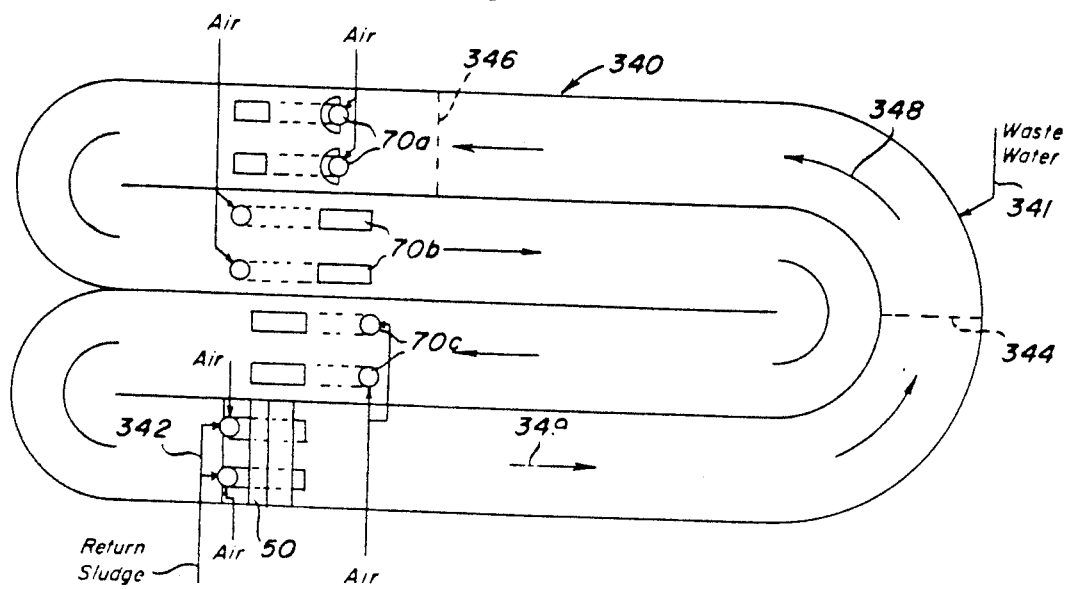

FIG. 51 shows a looped channel type of oxidation ditch 340 of such large capacity, relatively narrow width, and high biochemical oxygen demand that no more than a pair of axial-flow draft-tube pump/aerators can be placed in a barrier apparatus 50. The two pump/aerators therein can propel the mixed liquor at adequate velocity but are unable to provide all of the aeration that is needed. Indeed, a single pump/aerator in barrier apparatus 50 can handle the propulsion load.

Consequently, a plurality of directional-discharge pump/aerators 70a, 70b, and 70c, each having sufficient length to possess a water barrier, are installed in pairs in successive loops of the ditch to provide multi-source propulsion and multi-source aeration. Consequently, this multi-aerated ditch 340 receives raw wastewater 341 and is successively aerated by pump/aerators 70a, 70b, 70c and then homogeneously aerated by barrier apparatus 50 to which return sludge 342 is directed for mixing with the aerated wastewaters. Apparatus 70a is shown as preferably equipped with an extended intake baffle 86. Apparatus 50 adds the final amount of dissolved oxygen that is needed in discharge flow 349 for aerobic digestion and nitrification, both of which are completed when end 344 of the aerobic zone is reached. Denitrification is furnished when end 346 of the anoxic zone is reached. Flow 348 receives raw wastewater inflow 341 through a dispersal means, and luxury uptake of oxygen occurs at pump/aerator 70a.

While the foregoing embodiments are at present considered to be preferred it is understood that numerous variations and modifications may be made therein by those skilled in the art and it is intended to cover in the appended claims all such variations and modifications as fall within the true spirit and scope of the invention.

What is claimed is:

1. A baffle oxidation ditch, comprising:
   A. an endless channel having sides and containing flowing mixed liquor;
   B. a pump/aerator having a downdraft tube, an impeller which is rotatably disposed therewithin, aeration means disposed beneath said impeller for aerating mixed liquor which has been downwardly pumped by said impeller, means for controlling aeration of said flowing mixed liquor independently of flow velocity, and a discharge duct which is flow connected to the lower end of said downdraft tube and is aligned with said sides; and
   C. a baffle which is disposed approximately transversely to said sides and extends beneath the surface of said mixed liquor, said baffle being disposed to intercept a portion of said flowing mixed liquor which has moved past said pump/aerator and has not been downwardly pumped thereby.

2. The baffle oxidation ditch of claim 1, wherein said baffle comprises an adjusting means for adjusting the depth to which said baffle extends beneath said surface.

3. The baffle oxidation ditch of claim 2, wherein said adjusting means comprises a fixed portion which is rigidly attached to said sides and a sliding portion which extends a selected distance beneath the surface of said mixed liquor.

4. The baffle oxidation ditch of claim 2, wherein said baffle has holes therethrough that are disposed to provide induced flow close to said surface.

* * * * *